(12) United States Patent
Rachmiel et al.

(10) Patent No.: US 8,073,863 B2
(45) Date of Patent: Dec. 6, 2011

(54) BATCH MANAGEMENT OF METADATA IN A BUSINESS INTELLIGENCE ARCHITECTURE

(75) Inventors: Andrew G. Rachmiel, Park Ridge, IL (US); Neil P. Morgan, Hawthorn Woods, IL (US); Dariusz Danielewski, Hoffman Estates, IL (US)

(73) Assignee: BSP Software LLC, Rolling Meadows, IL (US)

( * ) Notice: Subject to any disclaimer, the term of this patent is extended or adjusted under 35 U.S.C. 154(b) by 424 days.

(21) Appl. No.: 11/964,624

(22) Filed: Dec. 26, 2007

(65) Prior Publication Data
US 2008/0195651 A1 Aug. 14, 2008

Related U.S. Application Data

(60) Provisional application No. 60/889,455, filed on Feb. 12, 2007.

(51) Int. Cl.
*G06F 17/30* (2006.01)
(52) U.S. Cl. .................................. 707/769; 707/803
(58) Field of Classification Search .................. 707/609, 707/707, 708, 758, 770, 802, 769, 803, 806
See application file for complete search history.

(56) References Cited

U.S. PATENT DOCUMENTS

| | | | |
|---|---|---|---|
| 6,061,684 A * | 5/2000 | Glasser et al. ........................ 1/1 |
| 6,088,694 A | 7/2000 | Burns et al. |
| 6,609,123 B1 | 8/2003 | Cazemier et al. |
| 6,611,838 B1 | 8/2003 | Ignat et al. |
| 6,662,188 B1 | 12/2003 | Rasmussen et al. |
| 6,728,697 B2 | 4/2004 | Leathers |
| 6,741,982 B2 | 5/2004 | Soderstrom et al. |
| 6,986,135 B2 | 1/2006 | Leathers et al. |
| 7,185,016 B1 | 2/2007 | Rasmussen |
| 7,275,211 B2 | 9/2007 | Ferguson et al. |
| 2005/0010597 A1* | 1/2005 | Potter et al. ................. 707/104.1 |
| 2005/0203931 A1* | 9/2005 | Pingree et al. ................. 707/100 |
| 2005/0234969 A1* | 10/2005 | Mamou et al. ................. 707/102 |
| 2005/0240354 A1 | 10/2005 | Mamou et al. |
| 2005/0240592 A1 | 10/2005 | Mamou et al. |
| 2006/0074986 A1* | 4/2006 | Mallalieu et al. ........... 707/104.1 |

(Continued)

OTHER PUBLICATIONS

International Search Report and Written Opinion issued in related International application No. PCT/US08/53021 mailed Nov. 6, 2008.

(Continued)

*Primary Examiner* — James Trujillo
*Assistant Examiner* — Soheila Davanlou
(74) *Attorney, Agent, or Firm* — Lempia Summerfield Katz LLC

(57) ABSTRACT

A metadata management system is described for a business intelligence architecture having a metadata repository for content that defines a user environment of the business intelligence architecture. The metadata management system includes a user interface generator to display information regarding a plurality of objects in the metadata repository and to facilitate selection of a group of the plurality of objects, a content editor to evaluate the content stored in the metadata repository for each object of the selected group and to modify in a batch job the content for each object of the selected group for storage of the modified content in the metadata repository, and a communication manager to issue instructions for the storage of the modified content in the metadata repository, the instructions being configured in accordance with a communication protocol of the business intelligence architecture utilized to control the metadata repository.

38 Claims, 18 Drawing Sheets

U.S. PATENT DOCUMENTS

| | | | |
|---|---|---|---|
| 2006/0095505 A1* | 5/2006 | Zimmer et al. | 709/203 |
| 2006/0219601 A1* | 10/2006 | Babanats et al. | 209/3.3 |
| 2006/0224617 A1* | 10/2006 | Inmon | 707/102 |
| 2007/0156726 A1* | 7/2007 | Levy | 707/100 |
| 2007/0299821 A1 | 12/2007 | McCully et al. | |
| 2008/0155411 A1* | 6/2008 | Christensen | 715/710 |
| 2008/0183744 A1* | 7/2008 | Adendorff et al. | 707/102 |
| 2010/0094803 A1* | 4/2010 | Yamakawa et al. | 707/609 |

OTHER PUBLICATIONS

Cognos product sheet, "IBM Cognos 8 Business Intelligence Reporting and Dashboards—Meet All Your Reporting Requirements," 4 pages (2008).

Cognos product sheet, "IBM Cognos 8 Business Intelligence Analysis—Discover the Factors Driving Business Performance," 4 pages (2008).

Cognos product sheet, "Cognos 8 Business Intelligence Analysis—Discover the Factors Driving Business Performance," 4 pages (Mar. 2006).

Cognos product sheet, "Cognos 8 Business Intelligence Reporting and Dashboards—Meet All Your Reporting Requirements," 4 pages (Sep. 2005).

Cognos product sheet, "Cognos Reportnet—The New Standard for Enterprises Reporting," 4 pages (Jan. 2005).

Cognos product sheet, "Cognos Reportnet—The Next-Generation Enterprise Query and Reporting Environment," 4 pages (Mar. 2004).

Cognos product sheet, "Proven Practice—Approach to the Cognos 8 SDK," 22 pages (2008).

Cognos product sheet, "Cognos 8 Software Development Kit—Installation and Configuration Guide," 12 pages (2006).

Cognos product sheet, "Cognos Enterprises BI Series Software Development Kit—Installation and Configuration Guide," 14 pages (2004).

Excerpts from "Developer Guide—Software Development Kit," Cognos ReportNet, 10 pages, including pp. 25-30, 81-82 (2004).

Additional excerpts from "Developer Guide—Software Development Kit," Cognos ReportNet, 29 pages, including pp. 3-23, 417-422, 425-426 (2004).

"Course Description" website, "IBM Cognos 8 SDK Self-Paced Training Package—eLearning," http://www-304.ibm.com/jct03001c/services/learning/ites.wss/us/en?pageType=course description&courseCode=B2171, 3 pages (May 2011).

Excerpts from "Self-Paced Training—Cognos 8 Software Development Kit," Cognos Incorporated, 32 pages (Copyright Notice dated 2005).

* cited by examiner

Framework Manager Project File:

C:\Program Files\Cognos\c8\webcontent\samples\Models\gosales_goretailers\gosales_goretailers.cpf Model Name Changes

| Type | Old Ref Path | New Ref Path | Date |
|---|---|---|---|
| 2 -- Query Subject Modification | [gosales_goretailers].[Orders] | [gosales_goretailers].[Order] | 2007-07-09 09:38:45 |
| 3 -- Query Item Modification | [gosales_goretailers].[Products].[Product line] | [gosales_goretailers].[Products].[Product lines] | 2007-07-09 09:38:50 |
| 3 -- Query Item Modification | [gosales_goretailers].[Products].[Product type] | [gosales_goretailers].[Products].[Product types] | 2007-07-09 09:38:51 |
| 3 -- Query Item Modification | [gosales_goretailers].[Products].[Product name] | [gosales_goretailers].[Products].[Product names] | 2007-07-09 09:38:53 |
| 3 -- Query Item Modification | [gosales_goretailers].[Products].[Description] | [gosales_goretailers].[Products].[Descriptions] | 2007-07-09 09:38:54 |

Available Packages: GO Sales and Retailers ▼

| Report | Progress | Validation |
|---|---|---|
| ✓ Actual Sales against Target Sales | No Changes | |
| ✓ Actual Sales against Target Sales burst | No Changes | |
| ✓ Add Color | Saved | |
| ✓ Add Header and Footers | Saved | |

110

114

Update

FIG. 7

Add Change

Change From:
[gosales_goretailers].[Products].[Product name]

Change to:
[gosales_goretailers].[Products].[Product Name]

OK    Cancel

BATCH MANAGEMENT OF METADATA IN A BUSINESS INTELLIGENCE ARCHITECTURE

CROSS-REFERENCE TO RELATED APPLICATION

This application claims the benefit of U.S. provisional application Ser. No. 60/889,455, filed Feb. 12, 2007, the entire disclosure of which is hereby expressly incorporated by reference.

BACKGROUND OF THE DISCLOSURE

1. Field of the Disclosure

The disclosure relates generally to business intelligence software and systems and, more particularly, to management of metadata utilized to define user information, presentations and other aspects of business intelligence systems.

2. Brief Description of Related Technology

A wide variety of business functions are commonly supported by software applications and tools. For instance, software has been directed to performance analysis, project tracking, and competitive analysis, to name but a few. One widely available type of business software, often referred to as enterprise resource planning (ERP) software, is alone used in a broad array of business areas, including, for instance, manufacturing, distribution, purchasing, accounting, and personnel management. In these ways, software applications and tools have been used in connection with tasks as varied as product planning, inventory maintenance, and customer service.

ERP software and other business applications have typically relied upon a database management system (DBMS) to handle the storage of the often vast amounts of enterprise data involved. The DBMS is also often faced with storing data from a number of disparate business areas or groups. Business applications and the underlying databases typically rely on data schemes involving metadata (in one aspect, data about data) to generally describe and specify the wide-ranging nature of the enterprise data. For example, the metadata for a business application can be used to specify the definitions, sources and relationships of enterprise data underlying tables, fields, etc. of the database that present, in an organized fashion, specific subsets of the enterprise data. Another layer of metadata may then specify the manner in which customized reports detailing, for instance, customer sales orders or inventory status, are generated from the tables, fields and other data constructs supported by the database.

In some business applications, the metadata is aggregated and arranged in the form of a model that describes the data sources and relationships of the enterprise data. For example, metadata models typically specify the familiar names for the data fields (e.g., employee name, address, social security number, etc.), as well as mapping information to bind each object in the model (e.g., employee address) to a data source, database table field, or other location. Without the model, the information identifying the data source or location could be too cryptic for a typical user to define new views, reports, etc. of the data.

The proliferation of business intelligence technologies (e.g., OLAP or online analytical processing) and database-related tools (e.g., ODBC or open database connectivity) has led to widespread utilization of databases in the business context. Often within a single organization, a number of departments or other user groups establish respective information systems. The organization then ends up with multiple databases, and with a variety of different paradigms adopted for retrieving and delivering information from each one. Despite efforts toward standardization and integration, varying preferences across departments or business functions have led to information systems designed and constructed in accordance with the specific needs of the user group (e.g., finance, marketing, etc.). Larger enterprises can also present networking complexities. Moreover, each information system may use an entirely different set of business software tools. These variations in business software tools and information systems can impede information sharing between the user groups.

Software applications have been developed to address the challenges in sharing, and utilizing, information among different information systems, business software applications, and the underlying databases. The various databases within an organization may contain data useful outside of the business unit or user group managing the database. To address this possibility, existing business intelligence software has been directed to compiling and managing the data and information from the various sources in the organization. Several such software applications and systems are made commercially available by Cognos, including Cognos ReportNet and Cognos 8. These systems have provided web-based solutions based on a metadata model defining and characterizing all of the various data sources, data types, intelligence tools, and client users.

The deployment of the Cognos software has often led to significant accomplishments in integration and assimilation of data within an enterprise. Integration has, in fact, been so prominent so as to substantially increase the number of users, user groups, data sources, and data types, being assimilated. The resulting arrangement of metadata can be overwhelmingly large and complex. Under these circumstances, maintaining the integrity of the metadata and, thus, the continued functionality of the system, can be extremely time-consuming and prone to operator error.

SUMMARY OF THE DISCLOSURE

In accordance with one aspect of the disclosure, a metadata management system is useful for a business intelligence architecture having a metadata repository for content that defines a user environment of the business intelligence architecture. The metadata management system includes a user interface generator to display information regarding a plurality of objects in the metadata repository and to facilitate selection of a group of the plurality of objects, a content editor to evaluate the content stored in the metadata repository for each object of the selected group and to modify in a batch job the content for each object of the selected group for storage of the modified content in the metadata repository, and a communication manager to issue instructions for the storage of the modified content in the metadata repository, the instructions being configured in accordance with a communication protocol of the business intelligence architecture utilized to control the metadata repository.

In some cases, the content editor is configured to modify the content for each object in the selected group to reflect a change to a metadata name referenced in the object. Alternatively or additionally, the user interface generator is configured to facilitate the selection of all reports of the user environment of the business intelligence architecture such that the content editor is configured to modify the content of each report of the user environment impacted by the change to the metadata name. Alternatively or additionally, the user interface generator is configured to identify a metadata expression to be found in the content for each object of the selected group. The content editor may then be configured to replace each found instance of the metadata expression with an updated metadata expression.

The user interface generator may be additionally or alternatively configured to identify respective metadata expressions within each object of the selected group. The content editor may then be configured to associate the respective metadata expressions with each object of the selected group, each respective metadata expression being configured to generate a message to be displayed in association with the corresponding object during rendering of the corresponding object within the user environment of the business intelligence architecture. Alternatively or additionally, the user interface generator is configured to identify respective security metadata for each object of the selected group. The content editor may then be configured to associate the respective security metadata with the corresponding object of the selected group.

The user interface generator may be configured to identify a further object in the metadata repository to be associated with each object of the selected group in the batch job. The selected group may then correspond with a user role, a user class, or a user name of the user environment of the business intelligence architecture, where the metadata object specifies metadata for user displays of the user environment associated with the user role, the user class, or the user name of the selected group, after implementation of the batch job. Alternatively, the selected group corresponds with a number of report specifications of the user environment of the business intelligence architecture, where the metadata object specifies metadata for a report specification element to be incorporated into the report specifications upon implementation of the batch job.

In some cases, the content editor is configured to evaluate syntax of the content for each object of the selected group and to update a validation flag of each object when the syntax is valid. The content stored in the metadata repository for each object of the selected group may be set forth in an extensible markup language such that the content editor is configured to modify metadata set forth in the extensible markup language to modify the content.

The communication manager may be further configured to issue further instructions in accordance with the communication protocol to extract from the metadata repository the content stored in connection with each object in preparation for evaluation by the content editor. The content editor may then be configured to store a backup copy of the extracted content outside of the metadata repository before modification in the batch job.

In some cases, the communication manager is configured to package the instructions in one or more simple object access protocol (SOAP) envelopes. The communication manager may be configured to issue the instructions via a communication path of the business intelligence architecture utilized to control the metadata repository, where the communication path includes conversion of the modified content into binary large objects (BLOBS) to be stored in the metadata repository.

In accordance with another aspect of the disclosure, a computer-readable medium is adapted to store computer-executable instructions for supporting a business intelligence architecture having a metadata repository for content that defines a user environment of the business intelligence architecture. The computer-executable instructions include computer code to display information regarding a plurality of objects in the metadata repository, facilitate selection of a group of the plurality of objects, evaluate the content stored in the metadata repository for each object of the selected group, modify in a batch job the content for each object of the selected group for storage of the modified content in the metadata repository, and issue instructions for the storage of the modified content, the instructions being configured in accordance with a communication protocol of the business intelligence architecture utilized to control the metadata repository.

In some cases, the computer code to modify the content includes code to modify the content of each object in the selected group to reflect a change in a metadata name referenced in the object. Alternatively or additionally, the computer code to facilitate the selection of the group includes code to include all report specifications of the user environment of the business intelligence architecture in the selected group. Alternatively or additionally, the computer code to facilitate the selection of the group includes code to identify a metadata expression to be found in the content for each object of the selected group, where the computer code to modify the content includes code to replace each found instance of the metadata expression with an updated metadata expression. Alternatively or additionally, the computer code to facilitate the selection of the group includes code to identify respective metadata expressions for each object of the selected group, where the computer code to modify the content includes code to associate the respective metadata expressions with each object of the selected group, each respective metadata expression being configured to generate a message to be displayed in association with the corresponding object during rendering of the corresponding object within the user environment of the business intelligence architecture.

The computer code to facilitate the selection of the group may include code to identify respective security metadata for each object of the selected group, where the computer code to modify the content includes code to associate the respective security metadata with the corresponding object of the selected group.

In some cases, the computer-executable instructions further include code to identify a metadata object in the metadata repository to be distributed to each object of the selected group in the batch job. Alternatively or additionally, the computer code to evaluate the code includes code to evaluate syntax of the content for each object of the selected group, where the computer code to modify the content includes code to update a validation flag of each object when the syntax is valid. Alternatively or additionally, the computer-executable instructions include further computer code to extract from the metadata repository the content stored in connection with each object in preparation for evaluation of the content. The computer-executable instructions may then include further computer code to store a backup copy of the extracted content outside of the metadata repository before modification in the batch job.

BRIEF DESCRIPTION OF THE DRAWING FIGURES

For a more complete understanding of the disclosure, reference should be made to the following detailed description and accompanying drawing figures, in which like reference numerals identify like elements in the figures, and in which:

FIGS. 7 and 8 are simplified representations of exemplary display interfaces generated by the global change module of FIG. 6;

Figure 1:
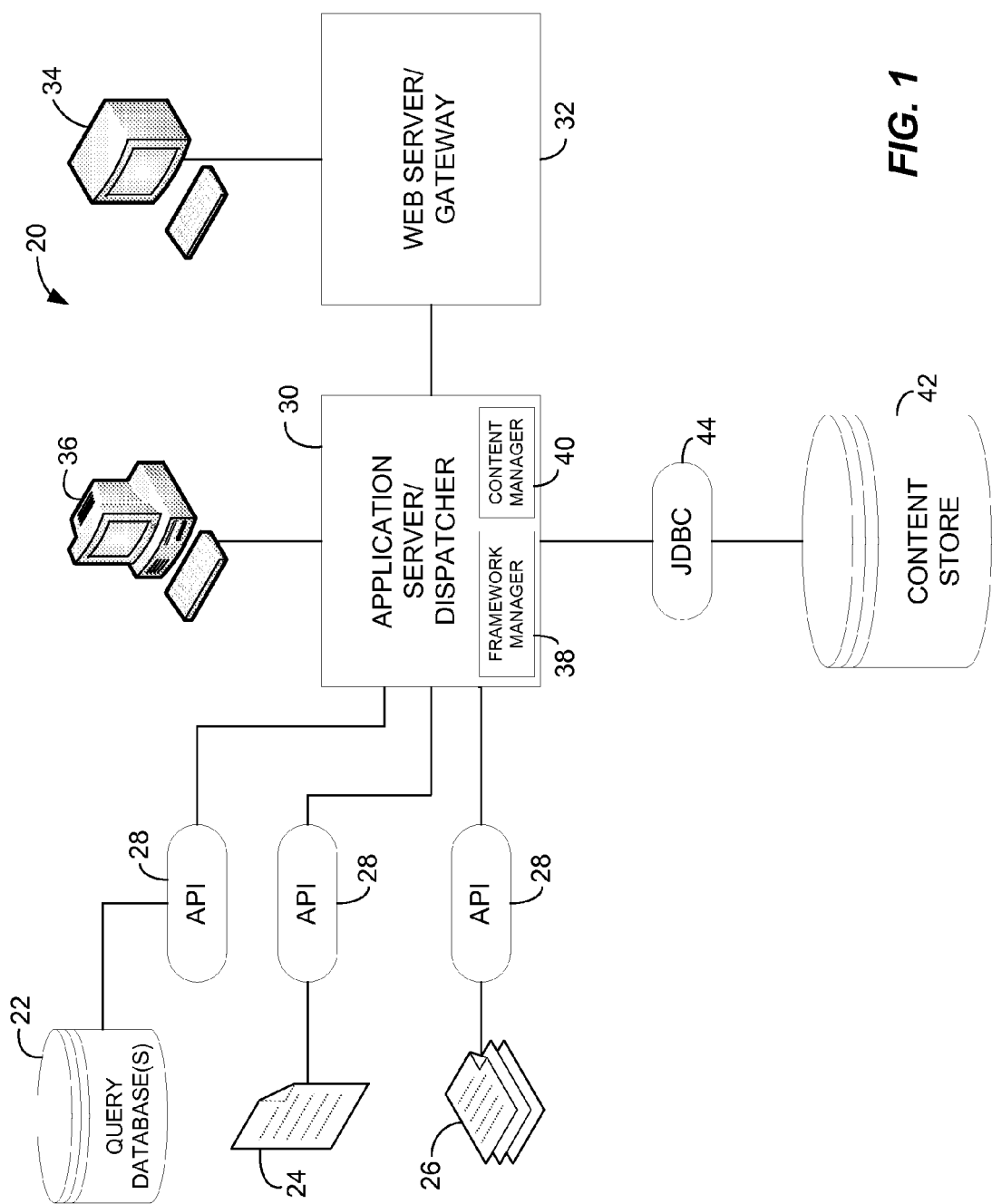
FIG. 1 is a schematic representation, or block diagram, of an exemplary business intelligence architecture.

While the disclosed systems, methods, and computer-executable techniques are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

The systems, methods and computer-executable techniques disclosed herein generally relate to the efficient and convenient processing of business application metadata stored in a metadata repository, such as a database. In some ways, the processing involves automated evaluation and modification of selected metadata. For example, user interface aspects of the disclosed systems, methods and techniques facilitate the selection of the metadata to be modified, disseminated, or otherwise processed. These aspects of the disclosure generally address the challenges faced by operations involving complex and voluminous business application metadata. Without the user interface elements of the disclosed techniques presenting the metadata content in a convenient organized fashion, it is often impractical, if not impossible, to know how to configure the evaluation, modification and other processing steps involved in metadata management.

Other aspects of the disclosure provide further convenience in the manner in which the processing of the metadata is implemented. More specifically, the modification tasks for a selected group of metadata objects are implemented collectively, in batch fashion, as described below. Generally speaking, this approach simplifies the management of the metadata, addressing a complex set of operations in a single transaction. In this way, several aspects of the disclosure provide a useful solution to the ongoing and extensive challenges presented by the administration and maintenance of large business intelligence architectures and the management of the underlying application metadata.

In some aspects, the disclosed techniques involve a program module that extracts data from a metadata repository for the purpose of modifying the content stored therein. After that processing is complete, the modified content is provided to the metadata repository for storage therein in accordance with communication channels and protocols utilized in the business intelligence architecture. In these and other ways, the implementation of the disclosed techniques can be compatibly integrated within the business intelligence architecture established for the organization.

Although described below at times in connection with a metadata repository having an object-oriented database architecture, practice of the disclosed methods, systems and programs is not limited to any particular type of data container or database architecture. More specifically, the business application metadata may be stored in one or more databases having a variety of different structures, data storage schemes, or architectures. For instance, the structure(s) may include one or more data containers, with each container having one or more records, the data within each record being organized into one or more fields. The structures may be arranged in a relational database system(s), where the data containers may be referred to as tables, the records referred to as rows, and the fields referred to as columns. Alternatively or additionally, object-oriented databases (and any aspects thereof) may also be utilized, in which the data containers may be referred to as object classes, the records referred to as objects, and the fields referred to as attributes. Any one or more of the databases described herein should be understood to alternatively or additionally include any one of these database architectures. In view of the foregoing, terms such as "object" should be read broadly and not limited to object-oriented database architectures, but rather to accordingly include corresponding elements or items of other database architectures.

The disclosed techniques are described below in connection with several examples involving the business intelligence applications available from Cognos, such as Cognos ReportNet and Cognos 8. Although well-suited for implementation with those applications, practice of the disclosed techniques is not limited to any one business intelligence architecture, application, or other software module. Accordingly, references to items or aspects that may be considered specific to a Cognos context should be instead be read broadly to include any one or more of the commercially available business intelligence architectures or environments.

With reference now to the drawing figures, FIG. 1 depicts a schematic representation of a web-based business intelligence architecture suitable for use with the disclosed techniques. The architecture includes a networked infrastructure indicated generally at 20 for supporting communications with any number of information systems to be integrated and assimilated within the architecture. In this example, a number of databases 22, any number of flat files 24 (e.g., an XML document or spreadsheet), and any number of data file sets 26 constitute the information systems that act as sources of data. The databases 22 may include or involve any commercially available database or database management system (DBMS), including those that are ODBC compliant. One or more of the databases 22 (or DBMS) may form part of a business software system, such as Microsoft Dynamics or Intuit Quickbooks. Each of the data sources may be accessed or controlled via respective application program interfaces (APIs) 28, but practice of the disclosed techniques is not limited to architectures or information source communications involving APIs.

The information provided by the data sources 22, 24, 26 is integrated by one or more business intelligence applications implemented on one or more application servers (or other workstations) 30. The applications may, but need not, correspond with the software modules made available with Cognos 8 and Cognos ReportNet. These applications and modules may run separately from, or independently of, the applications, modules and implementation of the techniques disclosed herein. Nonetheless, the applications and modules of the disclosed techniques may be integrated to any desired extent with the business intelligence applications implemented on the application server 30. For example, one aspect of the techniques described herein includes or involves the use of the communication protocols and channels established by the business intelligence application, even though the disclosed techniques need not be implemented on the workstations or servers 30 running the business intelligence software. As described below, use of the same communication protocols and channels can help maintain the integrity of the metadata.

The business intelligence application(s) generally support the creation, generation and management of reports and other presentations via the integration and assimilation of the data made available by the data sources 22, 24, 26. To this end, the application(s) may handle a variety of different requests (or queries) for data or information from the data sources 22, 24, 26. In Cognos examples, the application server 30 includes a dispatcher service to route such requests and distribute information and data to other components within and external to the infrastructure 20. The dispatcher may include a Java servlet, further details of which are well known to those skilled in the art.

TCP/IP and other web communications within the infrastructure 20 may be processed through one or more web servers or gateways 32. Each gateway 32 generally acts as an extension of a web server program or module that, for instance, is directed to transfers of information to and from one or more of the application servers 30. Any one of a number of different gateways 32 is suitable for use in connection with the disclosed techniques, including for instance CGI, ISAPI, Apache_Mod and Servlet. Alternatively or additionally, web communication occurs directly with a dispatcher on the application server 30, which may be useful when, for instance, a firewall is in place within the infrastructure 20.

Any number of user interfaces may be in communication with the application server(s) 30 either directly or indirectly. As schematically shown in FIG. 1, a browser client 34 may send and receive communications through the gateway 32, and a client workstation (e.g., a Microsoft Windows client) 36 may communicate with the application server 30 via a local area network (LAN) or any other desired connection or communication technique. The browser client 34, the client workstation 36, or any other terminal within the network infrastructure 20 may be utilized to implement the user interface programs utilized to author, maintain, or view the reports, presentations and other client elements of the architecture. In Cognos cases, the Report Studio (advanced authoring), Query Studio (basic authoring) and Cognos Connection (end user Web portal) are examples of the programs supported by the user interfaces 34, 36. More generally, any of the tasks or functions described herein may be controlled, directed or otherwise implemented via either the browser client 34, the client workstation 36, or any combination thereof, such that the disclosed techniques are not limited to any particular network or other hardware configuration.

Various aspects of the disclosed systems and techniques may utilize or involve interaction between managed code applications and server-based applications through the web services functionality of, for instance, Microsoft .NET framework (version 2.0 or higher). The disclosed techniques, however, are compatible with a variety of operating environments, including all of the environments utilized in connection with the aforementioned Cognos software Compatible operating systems include Microsoft Windows, UNIX and Linux.

The application server 30 may implement a number of program modules generally responsible for creating the business intelligence reports and other presentations of the user environment. For example, one or more program modules may be directed to modeling the metadata that links the business intelligence applications to the data sources 22, 24, 26. The model may identify the specific locations within the data sources 22, 24, 26, as well as otherwise describe the data and information made available thereby. In the Cognos examples, a Framework Manager module 38 supplies this functionality to manage the metadata model file, model.xml, in which these metadata definitions are stored. The metadata model may also define new composite tables, or packages, to organize the data source definitions. For instance, if the data sources provide multiple tables of customer information that collectively present data for a number of customer-related objects (e.g., customer name (CUST_NM), customer number (CUST_NO), and customer address (CUST_AD)), the Framework Manager module 38 may store the data source locations for each of the customer-related objects, create and store a new name space for each object (e.g., Customer Name, Customer Number, and Customer Address), and publish a package definition of this metadata for use within the architecture. More generally, the Framework Manager module (or a similar non-Cognos version) 38 provides a tool for the metadata layer corresponding with data access and initial selection, or definition of the data framework and packages to be assimilated and integrated. The definitions of this first layer of metadata for the business intelligence architecture may, but need not, be stored as an XML document (such as the model.xml file).

Further layers of metadata to support the business intelligence architecture may be created or managed utilizing other program modules implemented on the application server 30. For instance, selected subsets of the packages of source data selected initially may be selected in defining the reports, presentations and other elements of the user environment of the business intelligence architecture. In addition to report specifications and the like, this additional layer of metadata may also specify security information and other administrative aspects of the user environment. In Cognos examples, this functionality is provided via a content manager module 40 communicating with a metadata repository 42, which are generally responsible for storing and managing information and data created via the above-mentioned authoring programs. More specifically, the content manager module 40 (or a similar non-Cognos version) manages the storage of customer application data, including security, configuration data, models, metrics, report specifications, and report output. The content manager module 40 is thus utilized in publishing models, retrieving or storing report specifications, managing scheduling information, and managing the metadata namespace.

The layers of metadata defining and supporting the user environment(s) (e.g., a web portal) of the business intelligence architecture are stored in the metadata repository 42, which may include or involve one or more databases or other data containers. The metadata repository 42 may be referenced herein as a content store, or content store database, for ease in description along with the other components of Cognos deployments, but with the understanding that the metadata repository need not take the form of the content store of Cognos deployments. In some cases, the content store 42 may be a relational database, but more generally be supported by any commercially available database program or DBMS, such as those available from IBM (DB2), Oracle, Microsoft, etc. In some cases, the metadata objects utilized by the business intelligence architecture to create the user environments and otherwise operate are stored in the content store 42 as binary large object (BLOB) fields. For example, the metadata for report specifications, or the tables of security settings, may be created and set forth via XML definitions, which are, in turn, saved as BLOBs or other database objects. To this end, the content manager module 40 utilizes a JDBC (Java Database Connectivity) API 44 to access the content store 42 and support communications with the particular type of database(s) utilized.

Communications with the metadata repository 42 are supported by a protocol to maintain the integrity of the metadata defining the user environments of the business intelligence architecture. More specifically, requests for data are sent to the metadata repository 42 in accordance with a communication protocol to ensure that access to the content store is controlled in a desired manner. Similarly, the communications containing the results of the data requests are also made in accordance with the communication protocol. In Cognos examples, a single communication protocol is supported for communications with the content store 42, namely the Simple Object Access Protocol (SOAP). As is well known to those skilled in the art, SOAP envelopes or documents present a format and platform for exchanging XML-based messages. In other examples, communications with the metadata repository 42 may utilize multiple protocols. Nonetheless, one aspect of the disclosed techniques involves the use of a communication protocol authorized for communications with the metadata repository, regardless of the total number of protocols supported. In the example of FIG. 1, the authorized protocol(s) may correspond with those supported and utilized by the application server 30 and the JDBC API 44.

In some cases, communications with the metadata repository 42 may also be controlled or managed via utilization of one or more specified communication channels or paths. In the example of FIG. 1, the communication channel includes the path that the SOAP envelope takes as it progresses through the application server 30, the content manager module 40, and the JDBC API 44 onward to the content store 42. Controlling communications with the metadata repository 42 in this manner also helps to maintain the integrity of the metadata stored therein. To that end, another aspect of the disclosed techniques includes or involves the use of the communication channel(s) or path(s) authorized for tasks involving the metadata repository 42.

Figure 2:
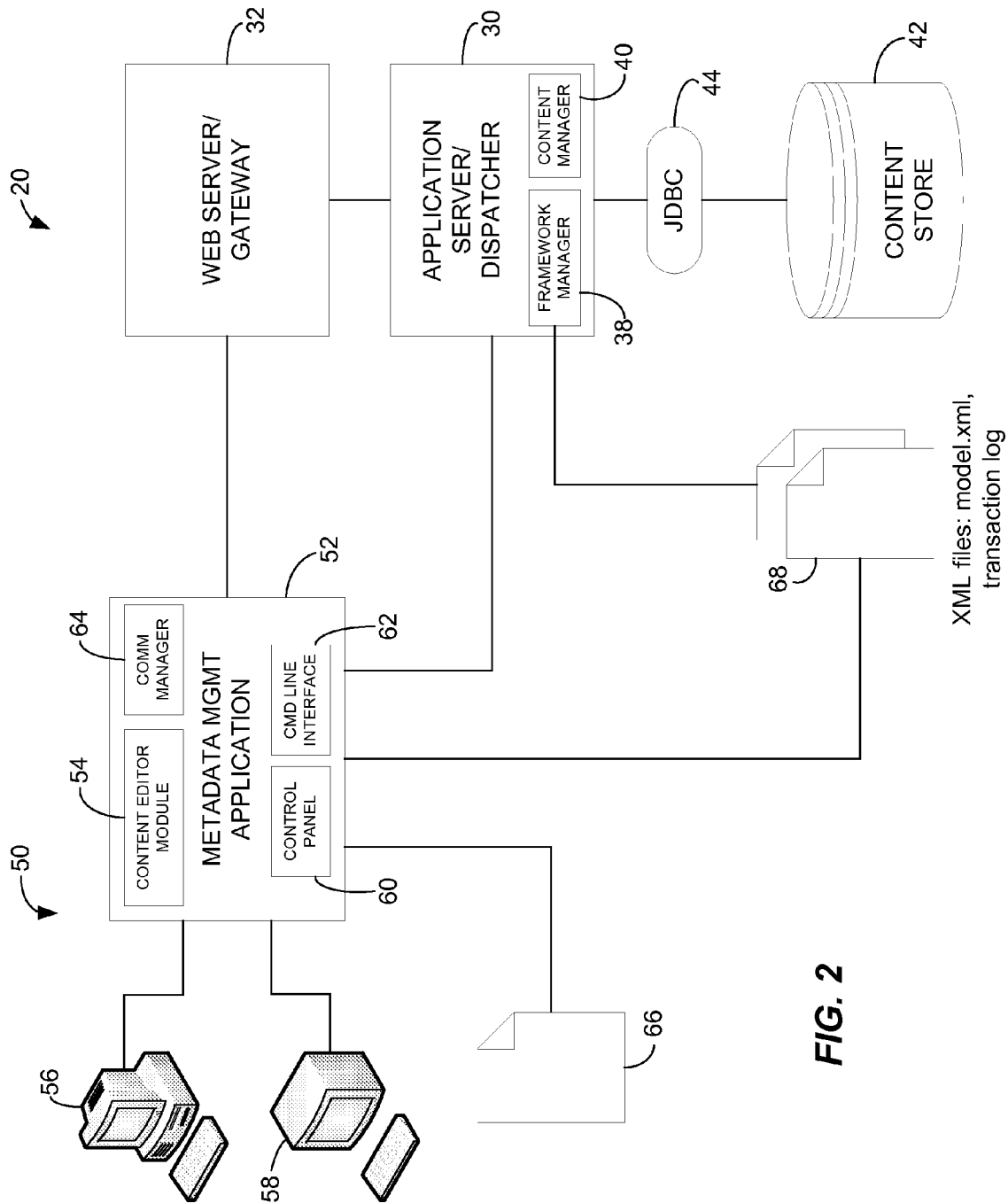
FIG. 2 is a block diagram of the business intelligence architecture of FIG. 1 integrated with an exemplary metadata management system for implementation of metadata management techniques in accordance with several aspects of the disclosure.

With reference now to FIG. 2, the infrastructure 20 of the business intelligence architecture is schematically shown in conjunction with a metadata management system indicated generally at 50 and configured for implementation of metadata management techniques in accordance with an exemplary embodiment of the disclosure. Generally speaking, the disclosed techniques include and involve communications with the content store 42 to manage the metadata stored therein. Accordingly, those components of the infrastructure 20 forming the path(s) for those communications are shown in FIG. 2.

The metadata management system 50 is generally configured to implement metadata management techniques that operate to control, manage and otherwise interact with the content store 42 as if the instructions, commands, requests, and other messages were originating from within the infrastructure 20 itself. This approach to metadata management ensures that the techniques disclosed herein remain compatible with the components and services of the business intelligence architecture. In addition to compatibility, working within the framework of the business intelligence architecture helps to avoid violations of service agreements with the provider or supporter of the business intelligence software.

The metadata management techniques of the system 50 are generally directed to addressing configuration and other errors that may propagate through the business intelligence architecture when changes are made to the metadata. More specifically, if a change is made to the metadata at a level upon which other layers of metadata are based, then the system 50 addresses the need to update the objects of the other metadata layers. For example, the initial change may involve a change in the namespace of the model established by the Framework Manager module 38 (FIG. 1) such as "Customer Name" to "Customer Names." References to "Customer Name" in various report specifications should be updated to reflect the new name, "Customer Names," or else running the reports will return an error. While one or more modules or programs of the business intelligence architecture may be configured to edit the report specifications, each report specification would need to be individually accessed, opened for editing, and edited and otherwise processed. Moreover, that process would assume that users would know which report specifications to access. In complex deployments of the business intelligence architecture, the user environment can present hundreds of objects for possible updating. Such conditions render the ongoing maintenance of the business intelligence architecture prone to user error.

In accordance with one aspect of the disclosure, the metadata management system 50 is generally configured to address the challenges of maintaining the metadata in an automated, batch fashion that avoids the inconvenience of individual object updates as well as the introduction of user errors. In some embodiments, the system 50 includes a number of modules that each share this aspect in implementing metadata management functions to edit the content stored in the metadata repository 42. Modification of the content in a batch job generally includes or involves a collection or set of instructions, actions or operations that, once initiated, do not require further user input or interaction. While the batch job may include or involve the transmission of separate instructions or messages to implement the content modification for respective objects or items in the metadata repository 42, the batch aspect of the metadata management techniques may treat the set or collection of instructions or messages as a single transaction of operational steps to be executed. In this way, a group of changes to the metadata repository 42 may be written or stored as a unit to maintain metadata integrity. The terms "batch job" and "transaction" are used herein without implying any details regarding the operational state of the system 50 or the infrastructure 20 during the implementation of the instruction list or other items within the batch job or transaction. For instance, both the system 50 and the modules running on the application server 30 may be on-line and fully operational during the implementation of a batch job. That is, the term "batch job" does not imply that the system 50 (or any user interface thereof is off-line during implementation of the batch job. Accordingly, in some embodiments, a batch job or transaction may be interrupted or terminated by a user via one or more interfaces provided by the system 50. On the contrary, the exemplary embodiments described herein are configured for operation as an operationally integrated extension of the business intelligence architecture.

Further operational details of the implementation of the metadata content-editing batch jobs of the disclosed techniques are set forth below in connection with a number of exemplary program modules. As shown in FIG. 2, the system 50 includes a metadata management application 52 having one or more content editor modules 54. The application 52 and any modules thereof may be implemented on a dedicated server or workstation or configured for distributed operation across a number of servers or workstations. In the example of FIG. 2, the metadata management application 52 is shown schematically as a separate component from a workstation client 56 and a browser client 58, although any other network or hardware configuration may be alternatively used.

In accordance with another aspect of the disclosure, the system 50 is generally configured to support one or more user interfaces to facilitate the implementation of the batch jobs or transactions. In the example of FIG. 2, the metadata management application 52 includes two exemplary program modules directed to user interface generation, namely a control panel module 60 and a command line interface module 62. These and other user interface generation modules may be implemented locally or remotely to support the user interfaces provided via, for instance, the workstation client 56 or the browser client 58. As a result, in some cases, the workstation client 56 may be a Microsoft Windows workstation that implements one or both of the modules 60, 62, as well as other program modules of the application 52.

As shown and described below with a number of exemplary content editor modules of the application 52, the user interface generation modules, such as the control panel module 60, are generally configured to present a front end to display information regarding the metadata stored in the metadata repository 42. Generally speaking, the front end may help a user to select certain objects or items within the metadata repository 42 to be involved in the modification operations. The front end user interface may include or involve any arrangement of user interface elements, as desired. In the examples shown below, the front end includes a tree or hierarchy view of the metadata objects and items stored in the metadata repository 42. Other arrangements may be used in addition or as an alternative to a tree or hierarchy view of the metadata. The front end user interface may also provide a mechanism for initiating the implementation of one of the content editor modules 54. One example of this functionality involves the control panel module 60 providing one or more navigation tools (e.g., user selects or buttons, drop-down menu options, hyperlinks, etc.) to select one of the content editor modules 54.

The application 52 may also include a communication manager module 64 to configure and otherwise manage the communications with the infrastructure 20 of the business intelligence architecture. As described above, the use of a communication protocol such as SOAP documents and the communication path through the application server 30 provide a mechanism for maintaining metadata integrity and service compatibility. The communication manager module 64 may be configured to prepare and receive the SOAP documents and envelopes involved in such communications.

As described further below, the system 50 may be configured in some embodiments to store or record the metadata modifications issued by the content editor module 54. Such recordation may include or involve storing a copy of the metadata object before the modification, as well as a copy of the metadata object as modified. In the example of FIG. 2, the recordation of the modifications is reflected in one or more transaction log archive files 66. In an alternative embodiment, the transaction log is used as an index to a local database (not shown) of the system 50 in which the metadata modification information is stored. Any number of other storage arrangements or techniques may be utilized as desired.

The exemplary embodiment of FIG. 2 is also configured for operation within a Cognos deployment or other business intelligence architecture in which metadata and other information relevant thereto is stored outside of the content store 42. In this example the application 52 and, more generally, the system 50 may access a number of documents or files made available within the infrastructure 20, such as XML document(s) 68 corresponding with the model.xml file referenced above, and a transaction log for the application server 30. These documents 68 may, for instance, be accessed by the system 50 to identify changes to the metadata model to be propagated through the remainder of the metadata levels and objects.

Figure 3:
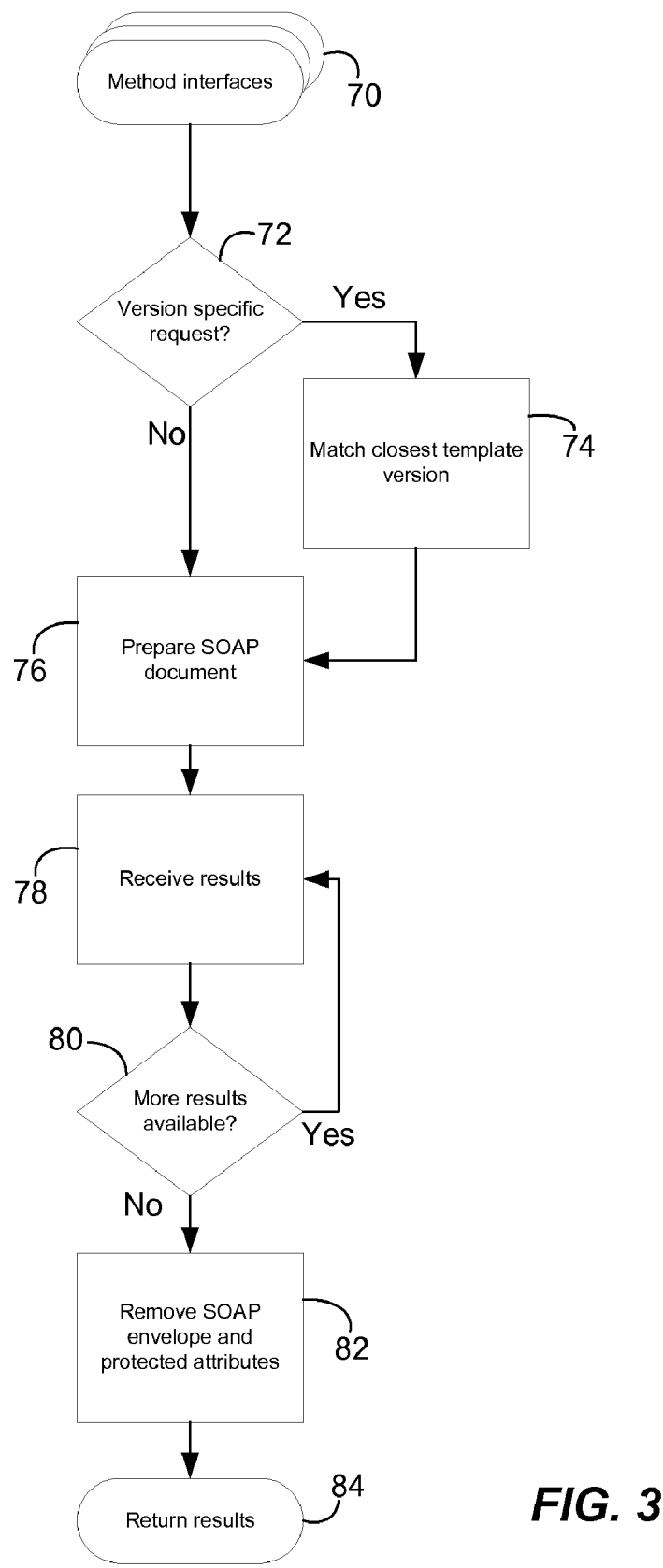
FIG. 3 is a flow diagram depicting steps implemented by a communication manager of the metadata management system of FIG. 2 in accordance with one aspect of the disclosure.

FIG. 3 depicts a flow diagram of steps implemented by the communication manager module 64 of the metadata management application 52 of FIG. 2 during an exemplary communication with the business intelligence architecture. In this case, the communication manager module 64 is implementing a routine or procedure to extract metadata from the metadata repository 42. The extraction of metadata may, for instance, be a part of a broader sequence of operations involved in modifying the metadata to reflect a change. Rather than try to change the metadata through direct queries and commands to the DBMS of the metadata repository 42, the disclosed techniques indirectly implement the modification via the communication protocol and path used during operations within the infrastructure 20 of the business intelligence architecture. Although the example of FIG. 3 is directed to a data extraction operation, the depicted steps may be generally reversed to show the operations involved in storing metadata content rather than extracting it.

After the desired content has been identified through one of the user interfaces of the system 50, the communication manager module 64 is generally configured to prepare a SOAP document or other instruction or message to serve as a data request to the content store 42. To this end, the procedure is initiated via one of the user interfaces in a block 70, after which the communication manager module 64 evaluates the instruction from the user interfaces in a decision block 72 to match a version of the infrastructure 20, if necessary, in a block 74. Eventually, control passes to a block 76 for the preparation of the SOAP document enclosing the request for metadata content. The SOAP document may then be passed via, for instance, TCP/IP communication through the applicable gateway(s), dispatcher(s), and other components of the infrastructure 20 to reach the content manager module 40 and the JDBC API 44 for the content store 42. After the SOAP document has been sent to issue the extraction instructions (and the BLOBs are extracted in accordance therewith), the communication manager module 64 receives the results in a block 78 and determines if more results are still arriving in a decision block 80. Once all of the extracted metadata content has arrived, control passes to a block 82 in which the communication manager module 64 removes the SOAP envelope and any protected attributes to reveal the metadata. The procedure then may terminate with a block 84 that returns the metadata to the requesting program module or user interface. In some cases, the returned metadata may take the form of XML script pulled out of the SOAP envelope, which had been stored as a BLOB element within the metadata repository 42.

In the examples to follow, the remainder of the automated metadata management techniques disclosed herein generally involve (i) saving the extracted XML or other metadata locally, (ii) evaluating or analyzing the extracted metadata for processing of any modifications, (iii) editing the XML script to implement the modifications, (iv) saving a representation of the modified metadata locally, and (v) packaging up the modifications in a SOAP document to pass back to the metadata repository 42 via the communication protocol and paths of the infrastructure 20 to store modified versions of the extracted BLOB(s) via the appropriate commands of the content manager module 40. In some cases, the order of the aforementioned sequence steps may be rearranged as desired. For instance, the saving or metadata storage steps may be combined to any desired extent, and may be implemented after the rest of the steps have been executed. Furthermore, and as described above, the storage steps may involve recordation of the XML scripts or other metadata in one or more transaction logs or archive files of the system 50.

The examples to follow present several contexts in which the foregoing operational sequence can be applied to manage metadata modifications in a batch job. The batch job may include or involve any number of iterations of the foregoing sequence, such that the implementation of the sequence may involve serial or parallel processing of each respective modification, or any combination thereof, as desired. In one example, the foregoing operational sequence may be implemented iteratively for each individual metadata modification, but still involve a single transaction directed by the metadata management application 52 and the content editor modules 54 thereof. Accordingly, practice of the automated, batch techniques is not limited to any specific arrangement of the foregoing sequence steps as they are applied to a collection or set of metadata modifications.

In each of the examples, steps involving the generation of a display interface or element thereof may include or involve the implementation of the user interface generation capabilities of the control panel module 60 (FIG. 2). Alternatively or additionally, each content editor module may include user interface generation functionality. Accordingly, the generation of user interfaces and elements thereof may be integrated to any desired extent with the functionality of the content editor modules. For example, those aspects or elements of the display interfaces common to each content editor context may be addressed by the control panel module 60 bergs, a metadata object hierarchy panel), while other portions of the display interfaces may be generated or otherwise addressed by the content editor modules respectively.

Figure 4:
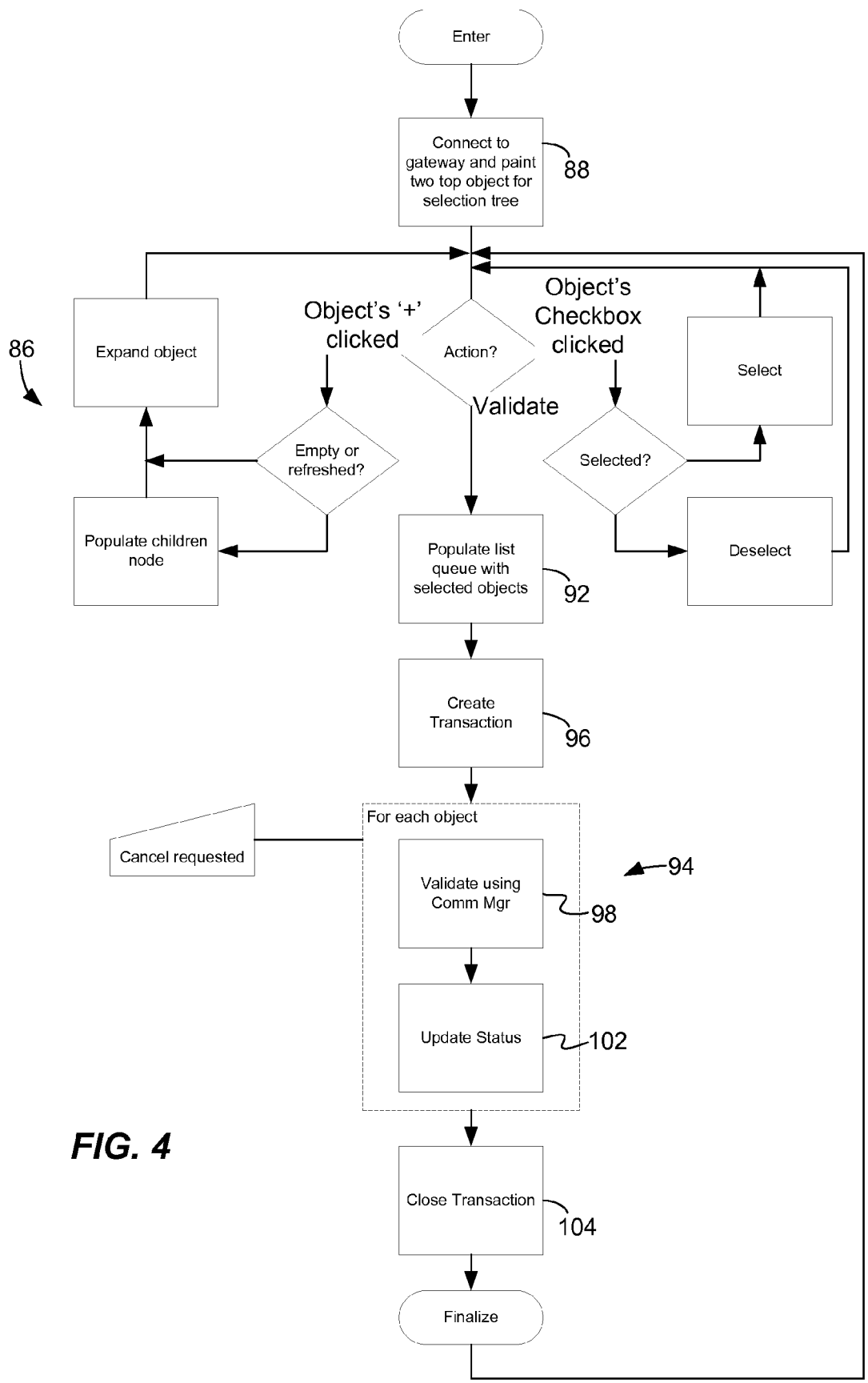
FIG. 4 is a flow diagram depicting steps implemented by an object validation module of an exemplary application executed by the metadata management system of FIG. 2 in accordance with one aspect of the disclosure.

FIG. 4 depicts a flow diagram of steps implemented by one example of a metadata content editor module of the disclosed metadata management system 50. In this case, the metadata modifications involve changing or updating a validation flag or indication stored in the metadata repository 42. In Cognos examples, objects such as report specifications defined in the content store are stored with, or include, an indication of whether the syntax and other attributes of the object are currently valid.

One or more aspects of the validation procedure shown in FIG. 4 may be implemented as a part of the techniques provided by other content editor modules. More specifically, validation of a metadata object to be modified may be implemented as a prerequisite to the modification. In this way, the disclosed techniques can avoid modifying (and perhaps further damaging) invalid objects. For ease in illustration, the exemplary operational sequence shown in FIG. 4 is directed to a validation operation independent of any other modifications. Nonetheless, the sequence of FIG. 4 may be representative of a user-initiated validation of a set of metadata objects after other modifications have been made to the metadata using, for instance, one of the other content editor modules 54.

Figure 5:
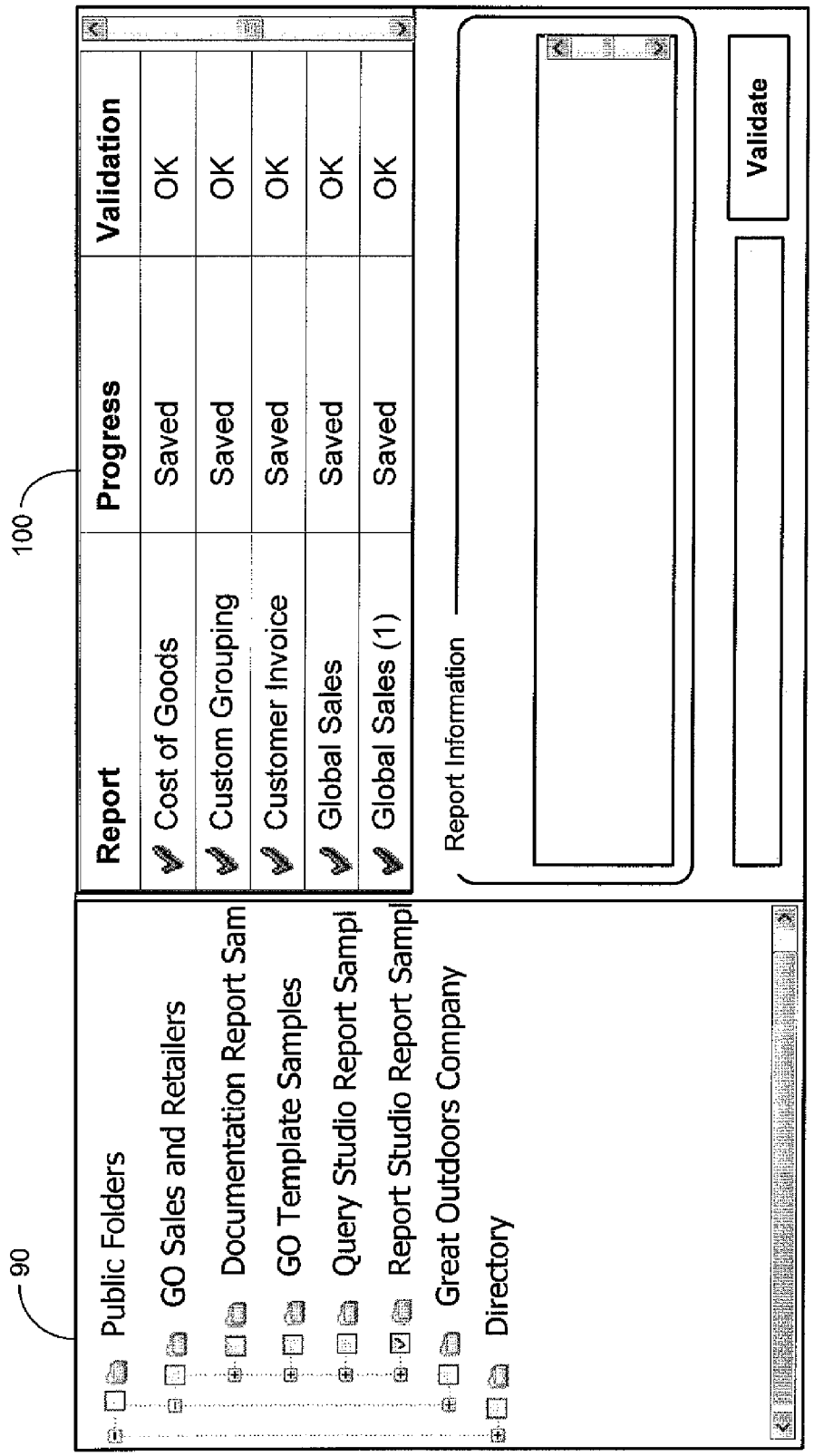
FIG. 5 is a simplified representation of an exemplary display interface generated by the object validation module of FIG. 4.

The example of FIG. 4 begins with a series 86 of processing steps directed to selecting a set of metadata objects (e.g., report specifications) to be validated. To this end, the validation module may communicate with, for instance, the control panel module 60 to generate a tree or hierarchy view of the metadata objects in a block 88. An example of the hierarchy view is shown in a pane or panel 90 of the display interface shown in FIG. 5. As shown in the series 86, the hierarchy view is expandable in the conventional fashion to reveal lower level (i.e., children) nodes of objects. The hierarchy view also presents a checkbox option for each object to facilitate user selection of any number of objects. A list of objects is generated in a block 92 to indicate those selected for validation. As part of this initial selection and batch job definition, the validation module may pass a request through either the gateway to the dispatcher or directly to the dispatcher and from there through the JDBC to the content store database, as described above, to retrieve the report specifications and other objects to be made available for possible selection and validation. User security may be taken into consideration.

Once the selected list of objects is complete, the user can select a "validate" or other option (see FIG. 5) made available via the user interface to initiate a processing portion 94 of the procedure. At first, a transaction is created in a block 96 to define the batch job to be implemented. For each report specification or other object selected, the metadata content is compared in a block 98 to the package (e.g., XML created from the Framework Manager Model's model.xml and stored in the Content Store) to ensure that the syntax of the specification is valid. The results are presented in a pane or panel 100 of the user interface shown in FIG. 5, which also provides the user with an opportunity to select any invalid reports (errors or warnings) in order to display more information via, for instance, an error or warning message. Possible results presented include "OK" (report validated with no problems), "Exception" (some type of anomaly occurred; possible failure), "Prompt" (report requires prompt answers that could not be supplied as part of the validation processing), "Warning" (errors may affect report integrity), "Errors" (report validation failed).

Generally speaking, each valid report is automatically resaved back into the content store in a block 102. In Cognos examples, validated reports are automatically saved with the validation flag set accordingly and, as such, are ready for use.

In some cases, all report specifications that were selected are archived into one transaction file in the local file system. Those that are valid retain the old XML and new XML prior to placing the new XML back into the content store in place of the old. Those with errors or warnings retain only the old XML, as nothing is changed.

Once the foregoing validation processing steps have been completed for each selected object, the batch job is finished, and the validation module closes the transaction in a block 104.

Figure 6:
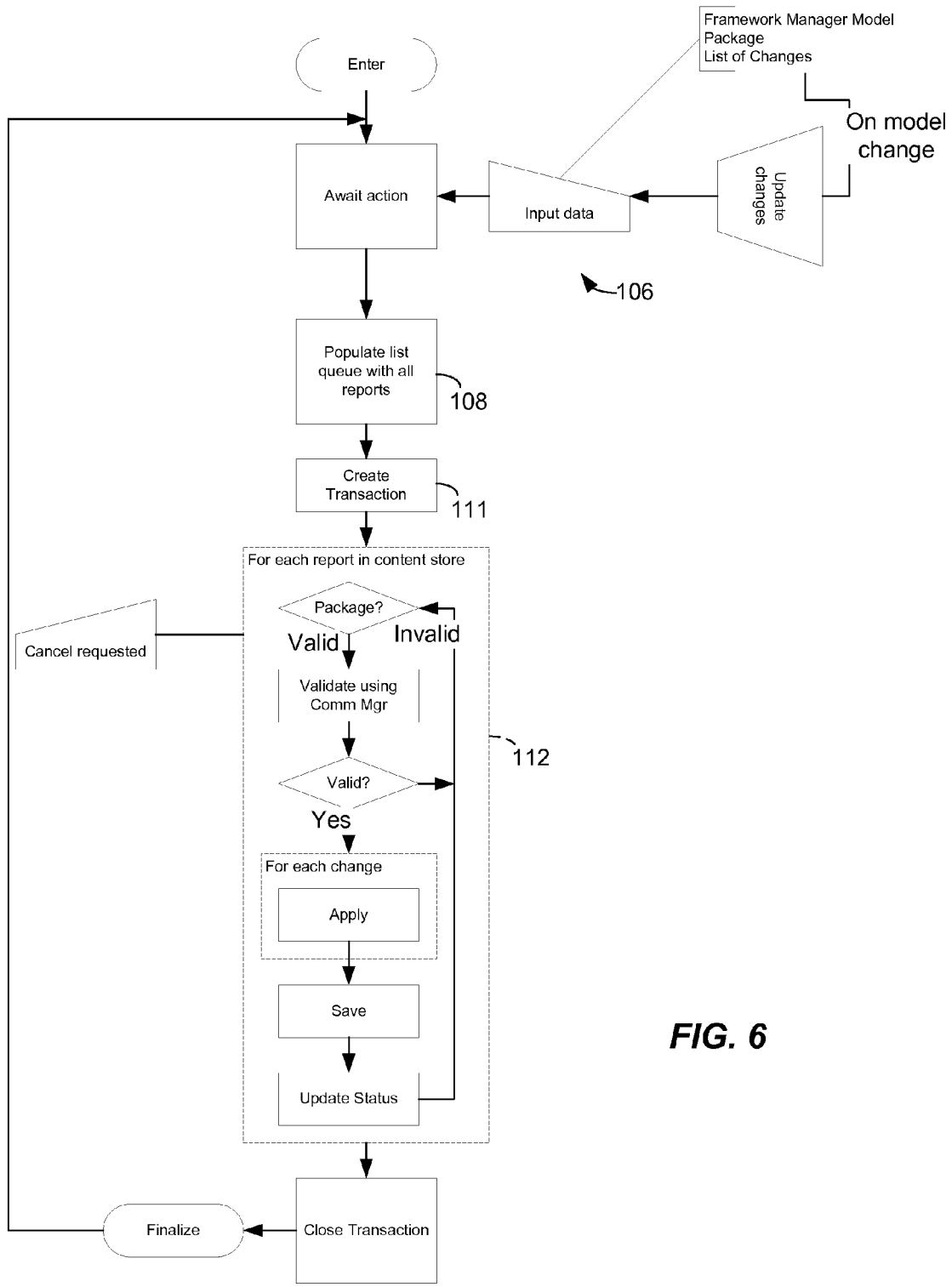
FIG. 6 is a flow diagram depicting steps implemented by a global change module of an exemplary application executed by the metadata management system of FIG. 2 in accordance with one aspect of the disclosure.

FIG. 6 depicts a procedure implemented by another exemplary content editor module, namely a global change module. Generally speaking, the global change module is configured to apply all name changes made within a Framework Manager model to the impacted reports (or other content store objects), thereby eliminating the manual steps otherwise necessitated by report specifications breaking (or being rendered non-operational) when name changes, such as query items, query subjects, or namespaces occur in the Framework Manager model and published package. Initiation of the sequence shown in FIG. 6 accordingly includes a series 106 in which the global change module awaits the identification of one or more of the Framework Manager model, the published package, or some other expression of the metadata layer subject to change. In Cognos examples, identification of the Framework Manager model.xml file may be sufficient to direct the global change module to the appropriate metadata objects in the metadata repository 42.

Once the underlying metadata area is identified, the transaction logs of the model (or other area defining container) are searched in a block 108 to identify all transactions involving changes to the name attribute of namespaces, query subjects and query items. The block 108 may also be responsible or involved with presenting the identified changes via a table or panel element 110 of a display interface, an example of which is shown in FIG. 7. A user may then be presented with the option of adding more or removing any number of model changes to be propagated through the other metadata layers. To this end, and as shown in the example of FIG. 8, a dialog box may be generated to provide data input fields for specifying the change. If necessary (e.g., if not done already), the user may also then select the applicable model package (e.g., the XML that is placed into the content store defining what web users can utilize to construct reports) to search. Execution of the block 108 then includes the passing of a request through the above-described communication path (e.g., either the gateway to the dispatcher or directly to the dispatcher, and from there through the JDBC to the metadata repository) to identify all report specifications built off of the specified package.

Once the report specifications are identified, a transaction is created in a block 111 to define a batch job in which each report is then parsed or otherwise evaluated to determine if the changed objects from the underlying metadata layer appear in the XML or other definition of the report specification. In the example of FIG. 6, the batch job involves a sequence 112 implemented for each identified report specification that includes validating the underlying metadata layer object(s) of the package necessitating the global name change (see the above-described steps regarding validation). Any reports that are found to have the old (pre-change) syntax are updated during the sequence 112 to automatically replace the old syntax with the new (post-change) syntax from the log file. Any modified specifications are automatically resaved back into the content store, and the validation flag is updated to indicate a valid state.

In some cases, all report specifications are archived into one transaction file in the local file system. Those report specifications that were modified retain the old XML (or other defining metadata) and new XML prior to placing the new XML back into the content store in place of the old. Those not modified retain only the old XML, as nothing is changed. The results of any updates or absence of any changes may be set forth in a table or pane 114 of the display interface, as shown in the example of FIG. 7. A column of the table 114 may also depict the results of the validation procedure that follows the name change operation(s).

Figure 9:
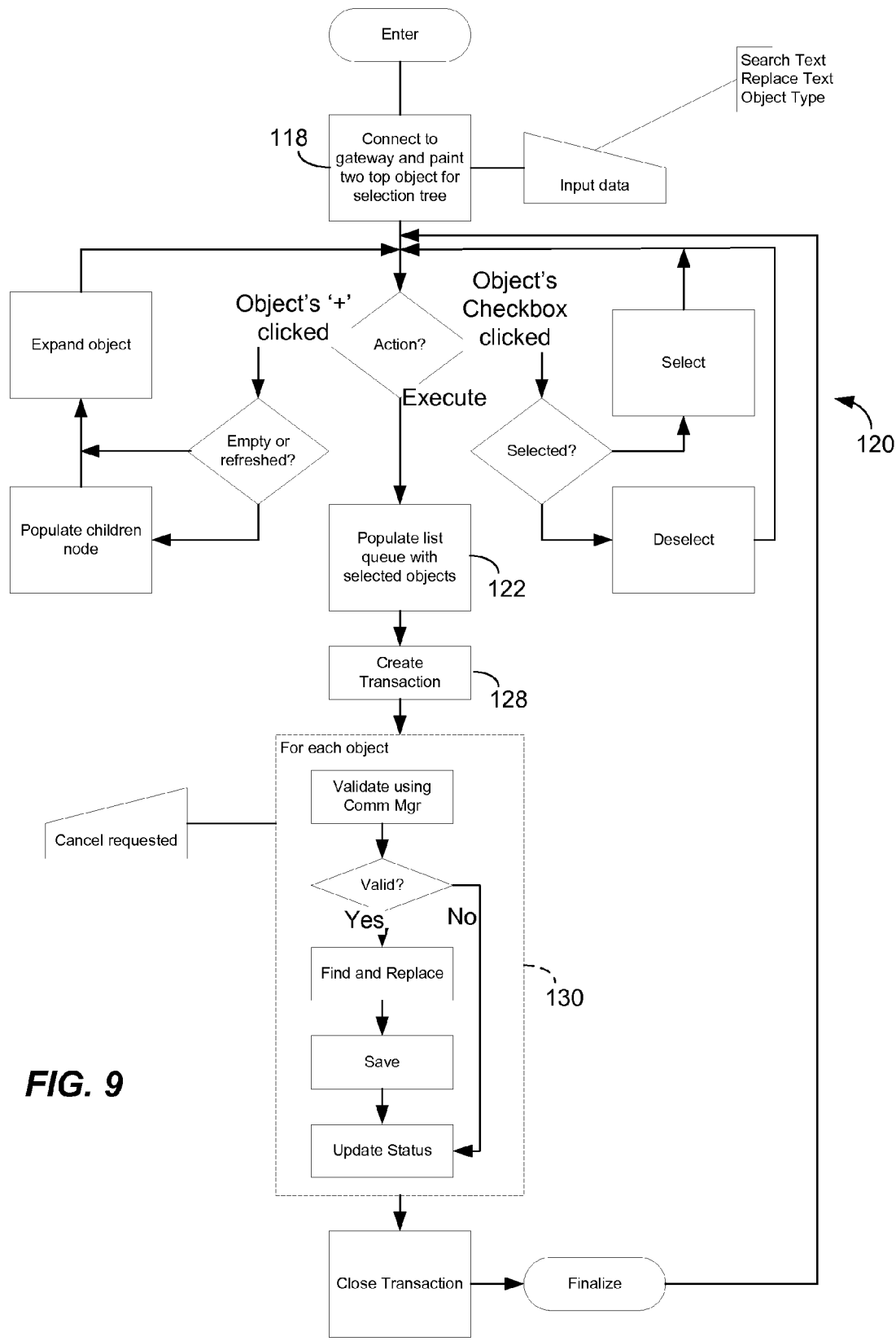
FIG. 9 is a flow diagram depicting steps implemented by a search and substitution module of an exemplary application executed by the metadata management system of FIG. 2 in accordance with one aspect of the disclosure.
Figure 10:
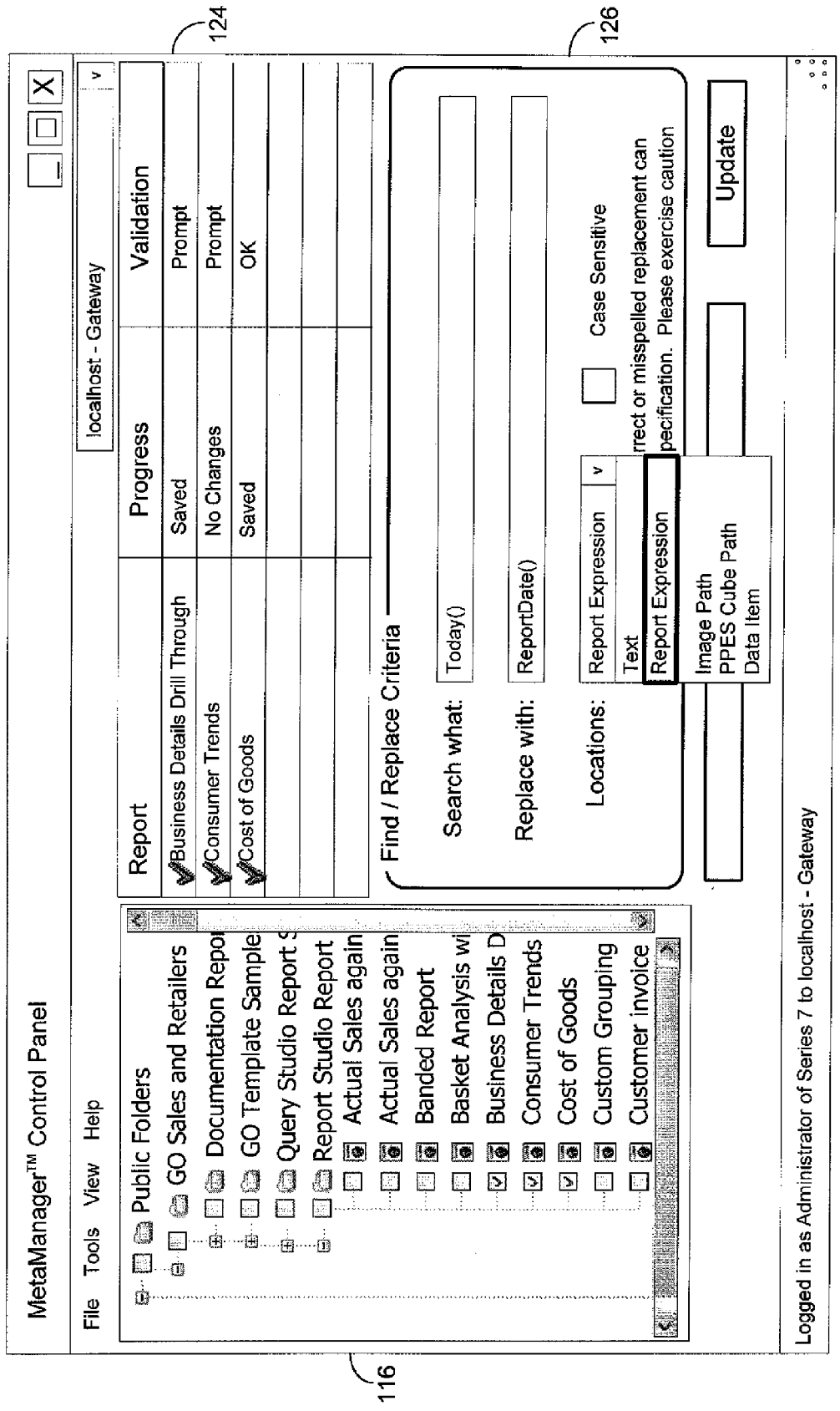
FIG. 10 is a simplified representation of an exemplary display interface generated by the search and substitution module of FIG. 9.

FIG. 9 is directed to depicting the operational functionality of yet another exemplary content editor module. Like the other modules, this module is generally based upon the selection of metadata objects to be evaluated and, if appropriate, modified. In this case, a search and substitution module provides find-and-replace functionality for a group of selected report specifications or other metadata objects. As shown in the example of FIG. 10, a panel or pane 116 of a display interface is generated to depict the objects available for selection. In a Cognos example, the report specifications and related folders, packages, etc. and custom pagelets are set forth in a tree or hierarchy view of the metadata. To that end, the steps implemented by the search and substitution module may begin with a block 118 in which a connection to the gateway (or other component of the infrastructure 20) is established and metadata is gathered from the metadata repository 42. A series 120 of steps may then be directed to selecting objects (e.g., report specifications) to be searched. Checkboxes within the pane 116 may be provided to facilitate the viewing and selection of metadata objects to be updated. Control then passes to a block 122 in which a panel or pane 124 of the display interface is populated with a list of the selected objects.

Next, the user is prompted or otherwise given the opportunity to identify the syntax or expression for which the search is to be conducted. In the example of FIG. 10, another pane 126 of the display interface provides a number of data input fields for specifying the search criteria, as well as the substitute expression. In Cognos examples, the XML element or tag location to be searched within may also be specified at this point.

With the search and substitution parameters identified, a transaction is created in a block 128 to define a batch job in which each selected object then parsed or otherwise evaluated to implement the editing functionality of the module. To this end, a sequence 130 is repeated for each selected object. More specifically, each selected object is evaluated for validation and, assuming a valid indication, and processed to replace the target metadata as specified. As with the other content editor modules, the sequence 130 may also include automatic local storage of the old and new metadata, and a status update to indicate a valid state.

In some cases, the search and substitution module is configured such that report specific content (e.g., text items, report expressions and image paths) may be changed, but the report XML tags may not be changed. In this way, the system 50 guards against changes that could cause the report specification to become invalid. Nonetheless, the module may still be used to change text expressions within a report, change referenced graphics, such as a company logo, change report expressions, such as AsOfDate( ) or PageNumber( ), change PPES Cube Paths, and change other individual data items.

Figure 11:
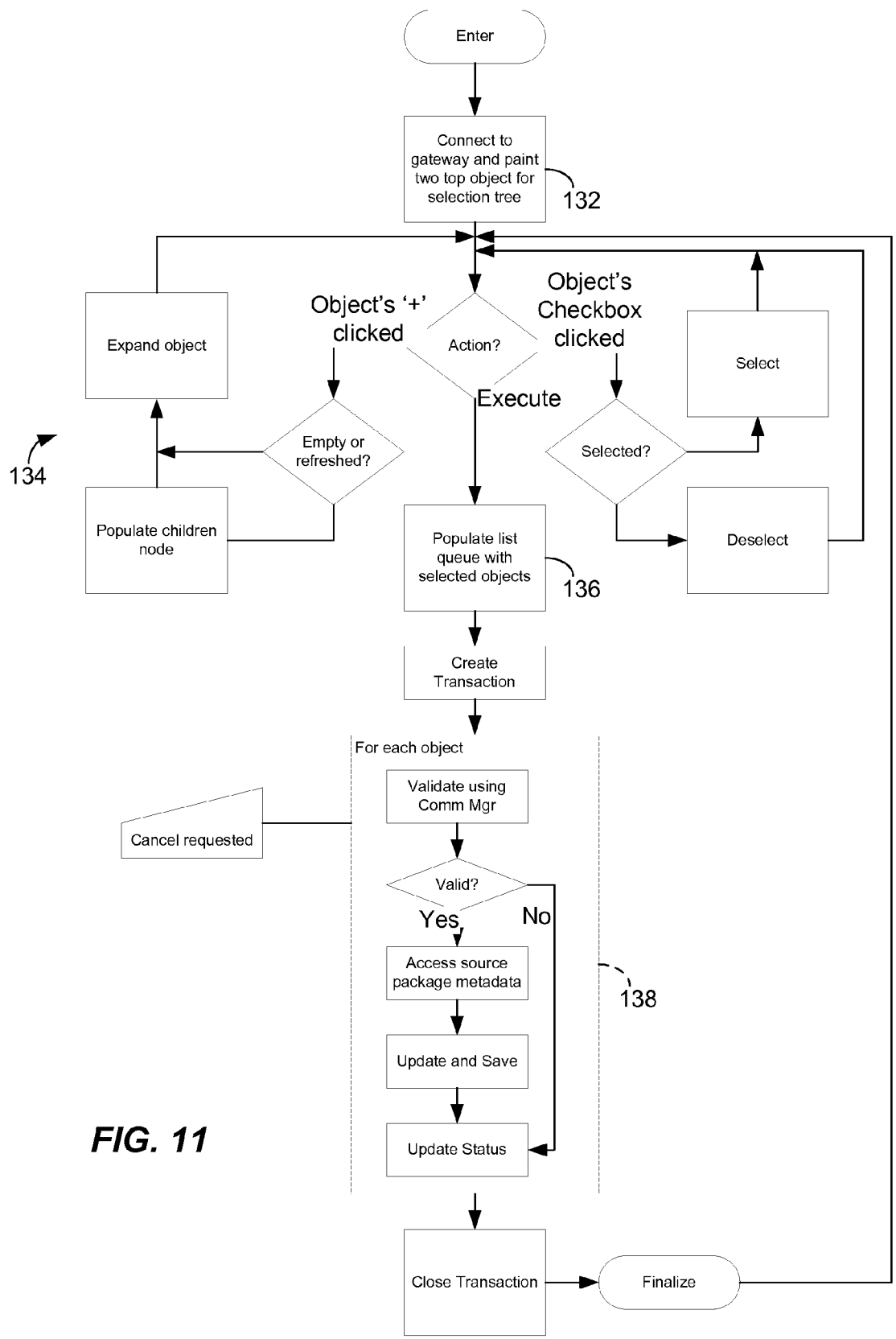
FIG. 11 is a flow diagram depicting steps implemented by a user interface information annotator module of an exemplary application executed by the metadata management system of FIG. 2 in accordance with one aspect of the disclosure.

FIG. 11 depicts the steps implemented by a user interface information annotator module directed to modifying the metadata associated with elements of a display interface of the user environment. This module edits the metadata content to enhance the environment of an end user of the business intelligence architecture by modifying the metadata to create annotations (e.g., screen tips or other messages) when prompted by the user. In some cases, the screen tips or messages may be automatically generated when the user hovers a pointer or other input device over the display interface element or item. In this way, this module may incorporate the metadata information of the model into the reports or other aspects of the user environment. For example, the module can populate report column headings with the metadata previously set forth in the Framework Manager model, thereby creating an integrated metadata environment.

Figure 12:
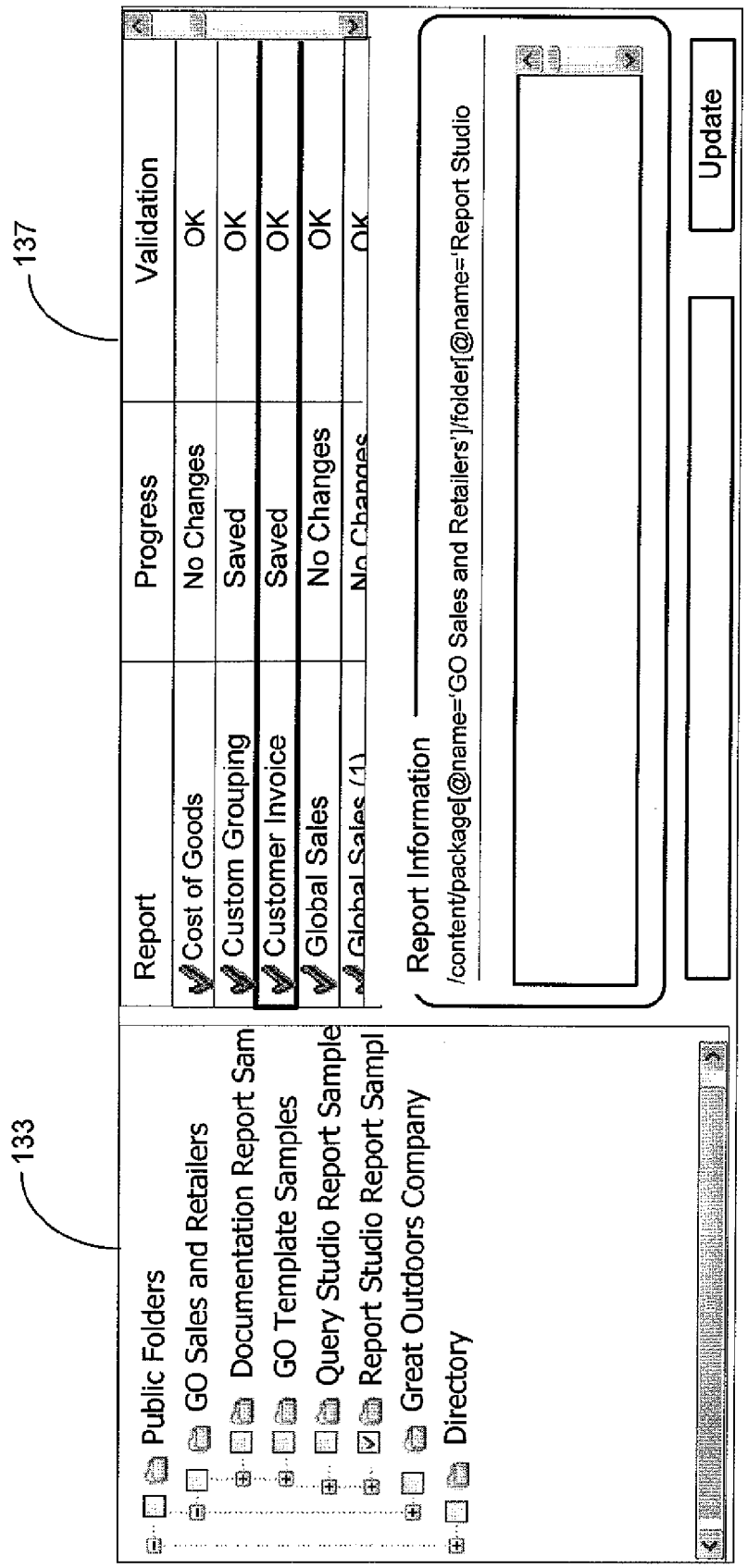
FIG. 12 is a simplified representation of an exemplary display interface generated by the user information annotator module of FIG. 11.

In operation, the information annotator module implements a series of steps similar to the other content editor modules, in the sense that (i) a block 132 gathers metadata information to support the generation of a display interface panel 133 with a hierarchal view for selecting the objects to be edited, (ii) a series 134 of actions are directed to selecting the objects for editing, (iii) a block 136 populates a pane 137 (see FIG. 12) with the selected objects, (iv) a batch transaction is created for executing the metadata editing in accordance with a sequence 138. As with the other exemplary modules, the sequence 138 may include comparing the selected specifications with the package to ensure that the syntax of the specification is valid, and storing old and new representations of any modified metadata.

In Cognos examples of this module, the sequence 138 may also include searching the model to determine if any query items listed in the report specification contain a screen tip attribute in the package. For all reports that have one or more query items with a screen tip attribute in the package, the syntax of the screen tip is placed into the report specification in the form of a <SPAN>screen tip</SPAN> tag around the query item object heading. In this way, this exemplary content editor module Screen Tip Generator adds the appropriate HTML SPAN tag item to the report columns, populating the tag with the contents of the screen tip attribute for each query item in the report.

Figure 13:
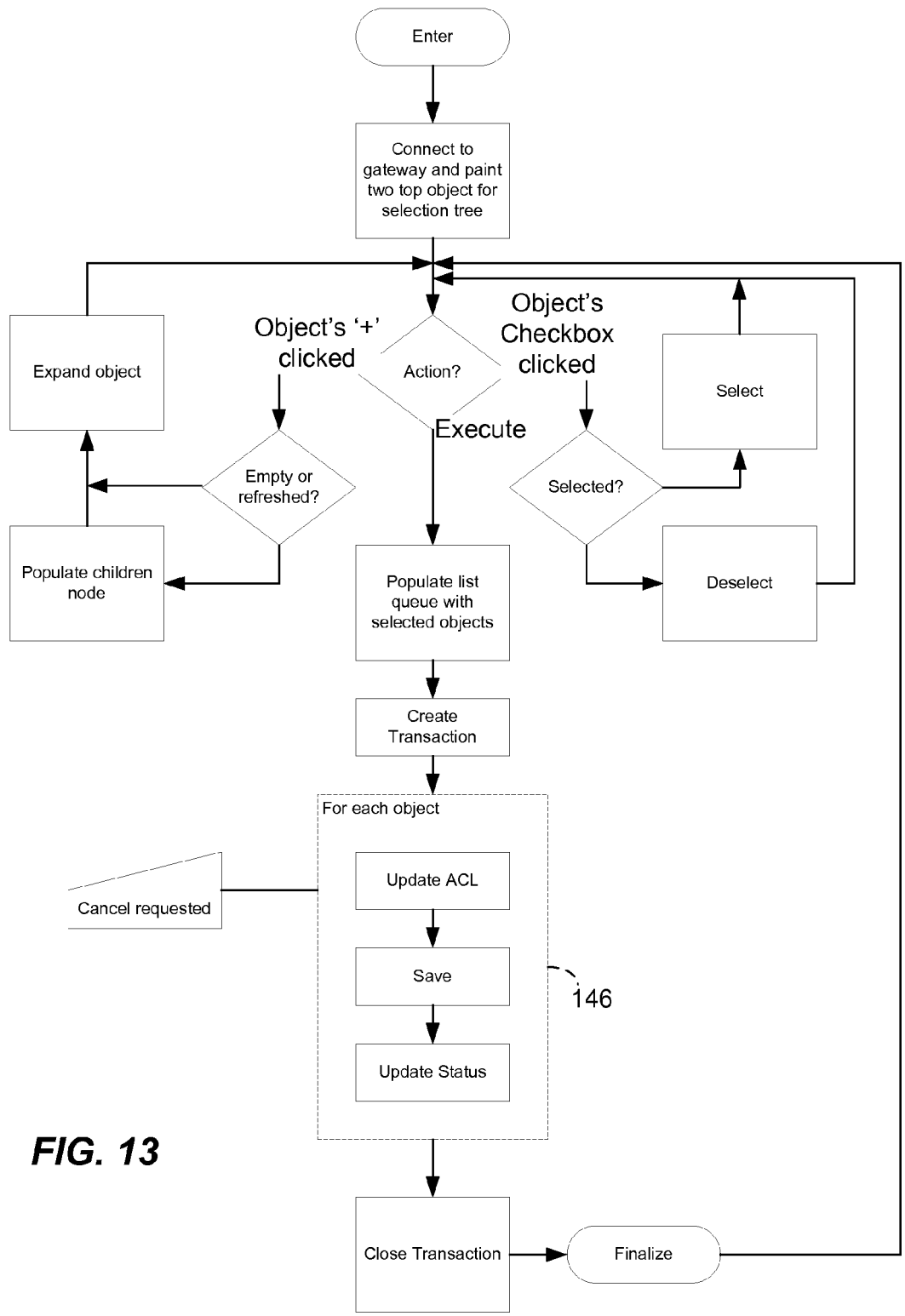
FIG. 13 is a flow diagram depicting steps implemented by a security editor module of an exemplary application executed by the metadata management system of FIG. 2 in accordance with one aspect of the disclosure.

FIG. 13 is directed to another exemplary content editor module in which metadata modifications can be made to selected objects. In this example, the modifications involve changing the security settings for selected objects. Once a reporting and analytical environment has been established for the business intelligence architecture, it is often useful to secure the environment so that the appropriate users see only their applicable content in the portal. A security editor module assists administrators in modifying any security setting of an object or a group of objects within the content store (e.g., packages, folders, reports, etc.) and then easily replicating the same object security setting to any one or more further objects in the content store.

Figure 14:
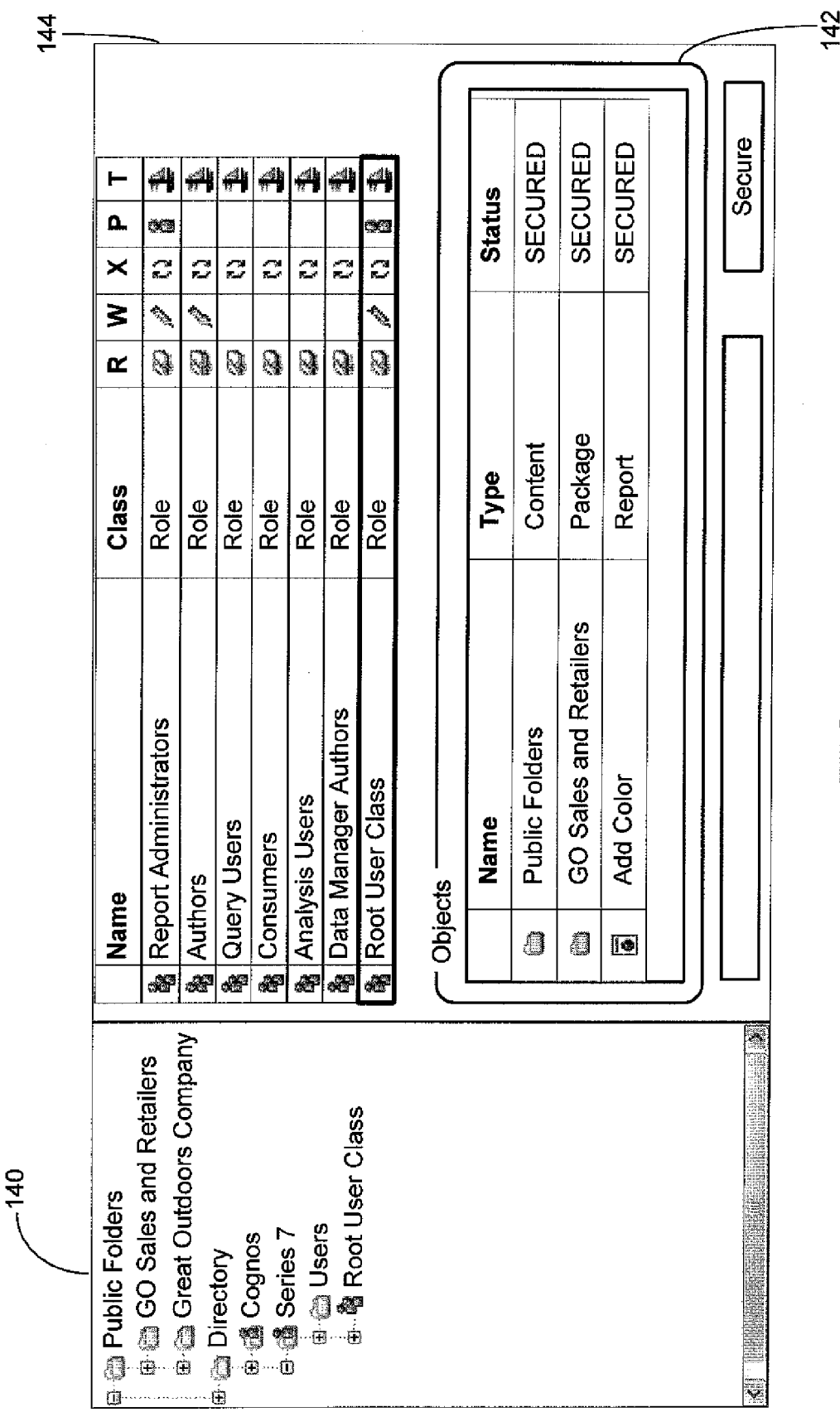
FIG. 14 is a simplified representation of an exemplary display interface generated by the security editor module of FIG. 13.

Selection of the objects may implemented and supported in a manner similar to those described above, and an exemplary flow is shown in FIG. 13 to that end. As a result, a pane or panel 140 of a display interface (FIG. 14) depicts the object hierarchy. In this case, the display interface includes a table or panel 142 depicting any package, folder, report specification, role, class, user or other object from the hierarchy, selected for processing via, for instance, dragging from the panel 140. Once dragged or otherwise selected, the current security settings for that object are displayed in a table or panel 144 of the display interface. If multiple objects are dragged over, the union of all objects' security may be displayed. The security settings displayed in the panel 144 can then be modified by removing objects via typical user interface techniques (e.g., right click options), modifying the security attributes of any existing objects via a number of selection boxes, adding new users, classes or roles from the object hierarchy, and removing objects by highlighting them and selecting from menu options.

Once satisfied with the selections and security setting modifications, selection of a Secure user select or button initiates a sequence 146 that includes passing a request through the authorized communication path to attach the necessary XML or other metadata information to the applicable objects so that they are secured in the desired manner. In Cognos examples, the available security settings include read-only permissions, write permissions, execution permissions to process data entry, security policy permissions, and traverse permissions (e.g., enabling the user to click on an object such as a folder and see the contents within that object). A number of defined roles within a Cognos deployment have predefined security settings within this framework, which may then be customized or otherwise modified via the metadata content editing functionality of this exemplary module.

Figure 15:
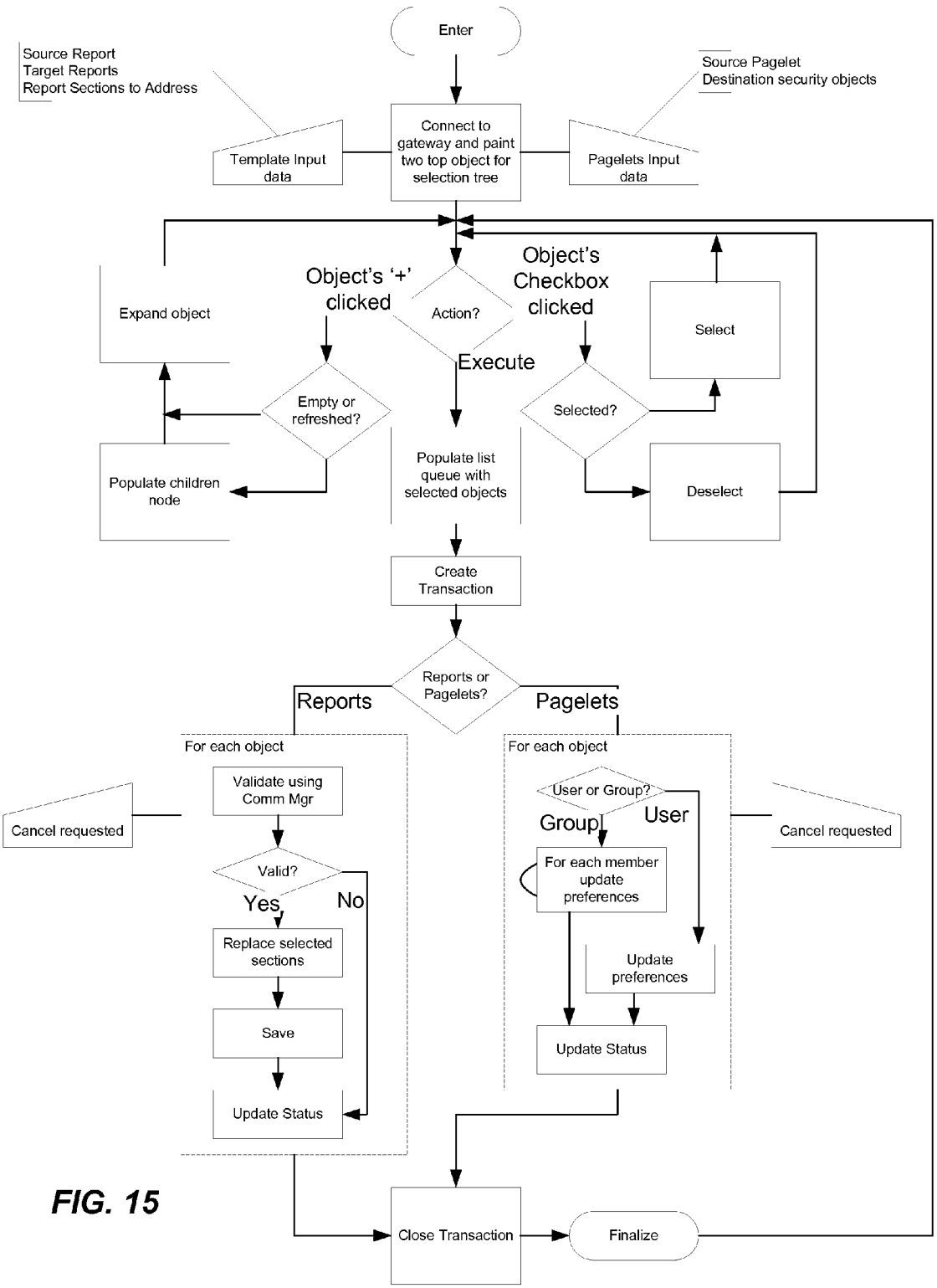
FIG. 15 is a flow diagram depicting steps implemented by a metadata object dissemination module of an exemplary application executed by the metadata management system of FIG. 2 in accordance with one aspect of the disclosure.

FIG. 15 is a flow diagram illustrating steps implemented by an exemplary metadata object dissemination module that may be configured for facilitating the standardization of the look-and-feel of the end user environment. Such standardization may be useful for application of corporate standard templates and the like. In addition, creating and distributing custom pagelets aids in the ease of use of those aspects directed to configuring the business intelligence architecture. To these ends, this module generally helps administrators easily replicate the look and feel of a standard template to existing reports (public or private) as well as distribute custom pagelets of a user portal to any and all named users, groups and roles. The steps set forth in the flow diagram are accordingly directed to both of these types of metadata object dissemination.

The operational steps are similar in several respects to those shown in the flow diagrams associated with the other content editor modules described above. Accordingly, the functionality of this module is described below to address aspects of its operation that differ from the other modules.

Figure 16:
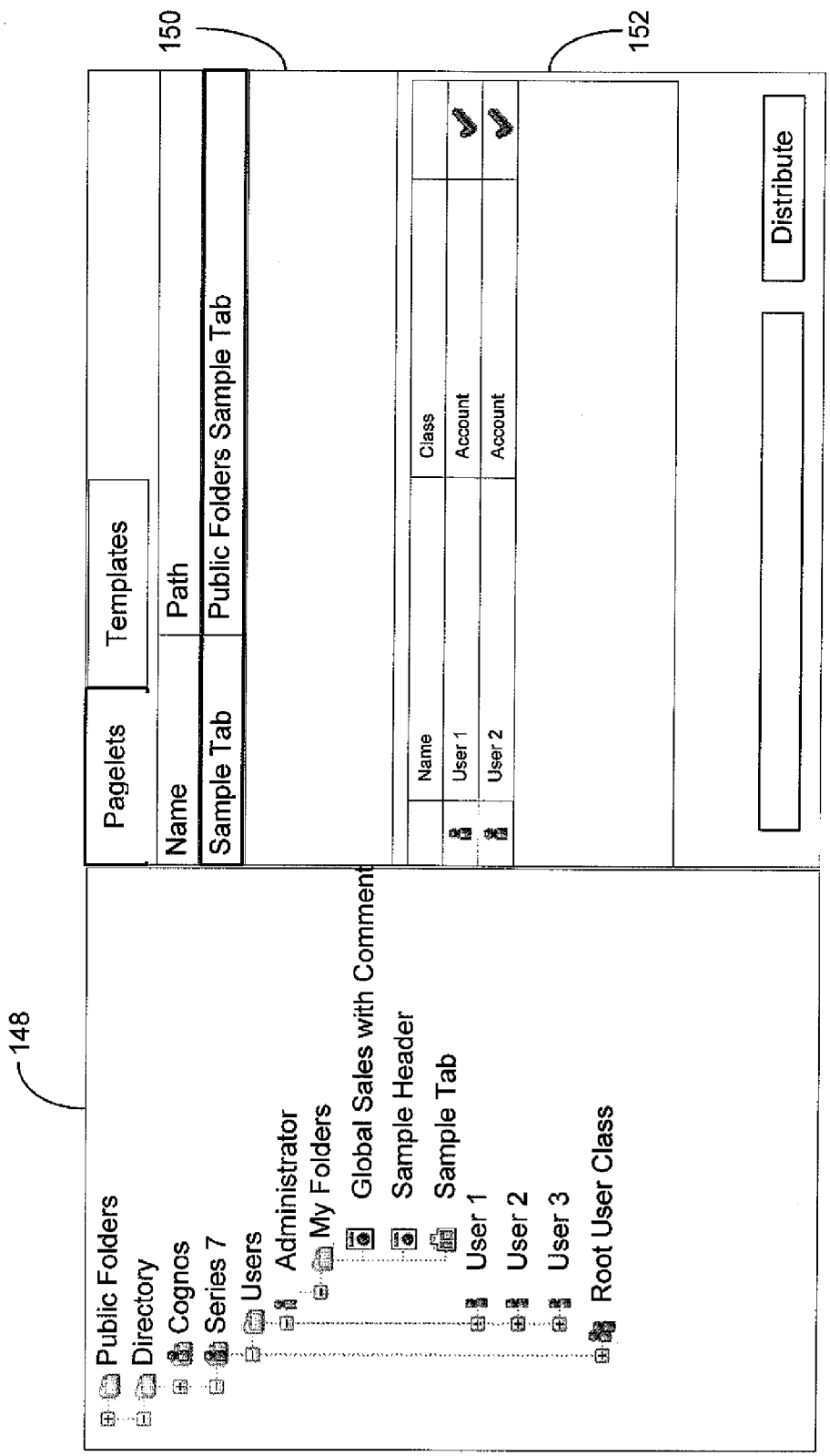
FIGS. 16-18 are simplified representations of exemplary display interface generated by the object metadata dissemination module of FIG. 15.

In Cognos examples, an end user environment such as the portal defined by Cognos Connection may consist of a collection of dynamic portlets that provide customized content. During configuration, different types of content can be selected and organized in a page(s) in a desired manner. For example, a user may want to view specific tools and reports, and have links to selected websites. Once established, this customized content view may be desired to be distributed to other users. To these ends, this module supports the selection of metadata objects for dissemination via a hierarchy view in a display interface as described above. As shown in FIG. 16, the display interface displays the report specifications (and related folders, packages, etc.) and custom pagelets in a panel or pane 148 of the display interface, and allows users to identify any number of objects to distribute. Pagelet objects can then be dragged from within the tree in the pane 148 to another panel or pane 150 of the display interface. Next, any role, class or user can then be dragged from within the tree in the pane 148 to a further panel or pane 152 of the display interface. These selections correspond with the objects to which the selected Pagelet object(s) will be distributed.

Once the user is satisfied with the selections, actuating a distribute user select or button passes a request through the above-described communication path to the content store database to attach the necessary XML information or other metadata to the applicable objects so that they contain the applicable Pagelet object(s) during a rendering of the user environment.

Figure 17:
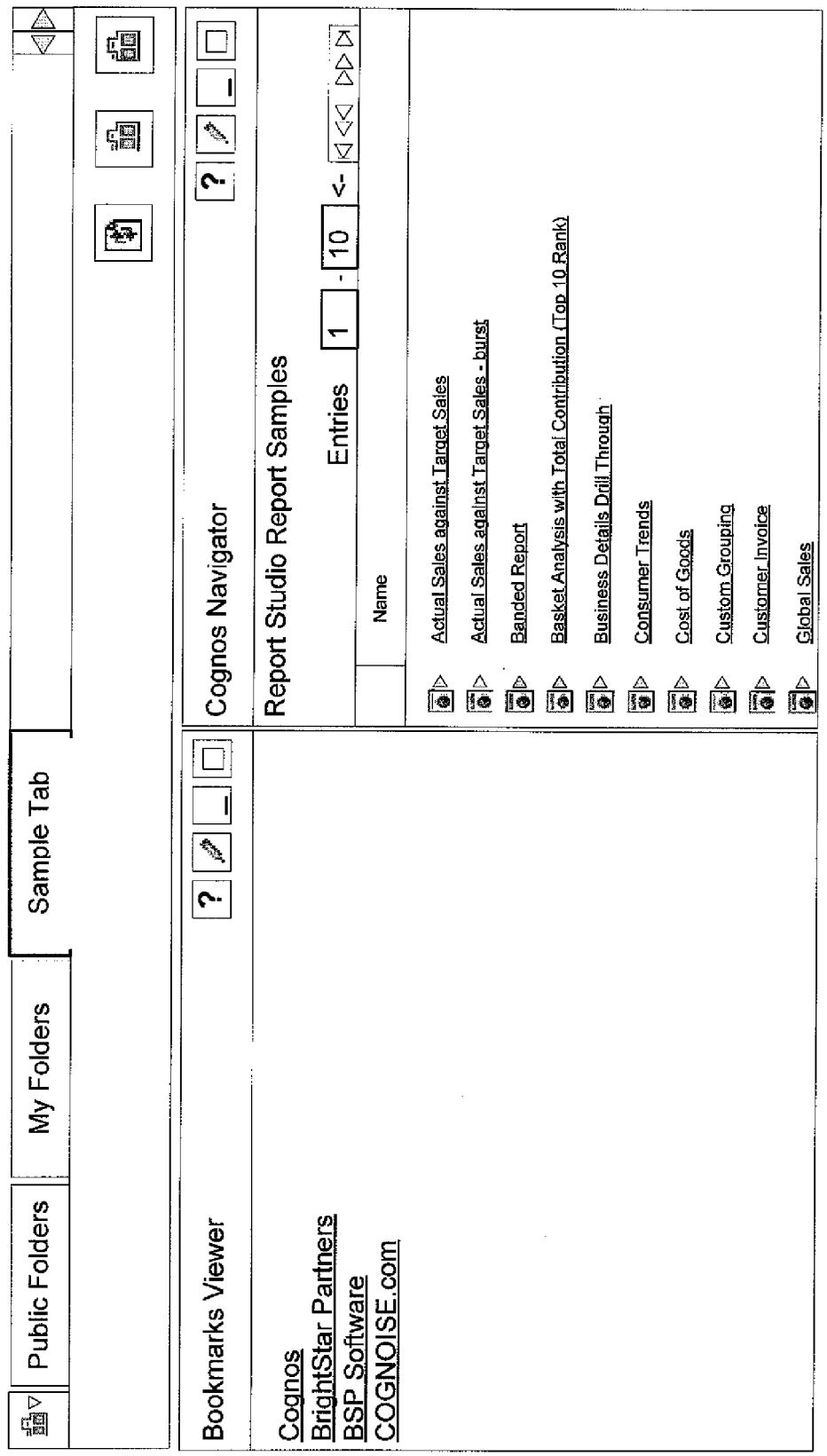

An example of a pagelet rendered as part of a Cognos deployment is shown in FIG. 17.

Figure 18:
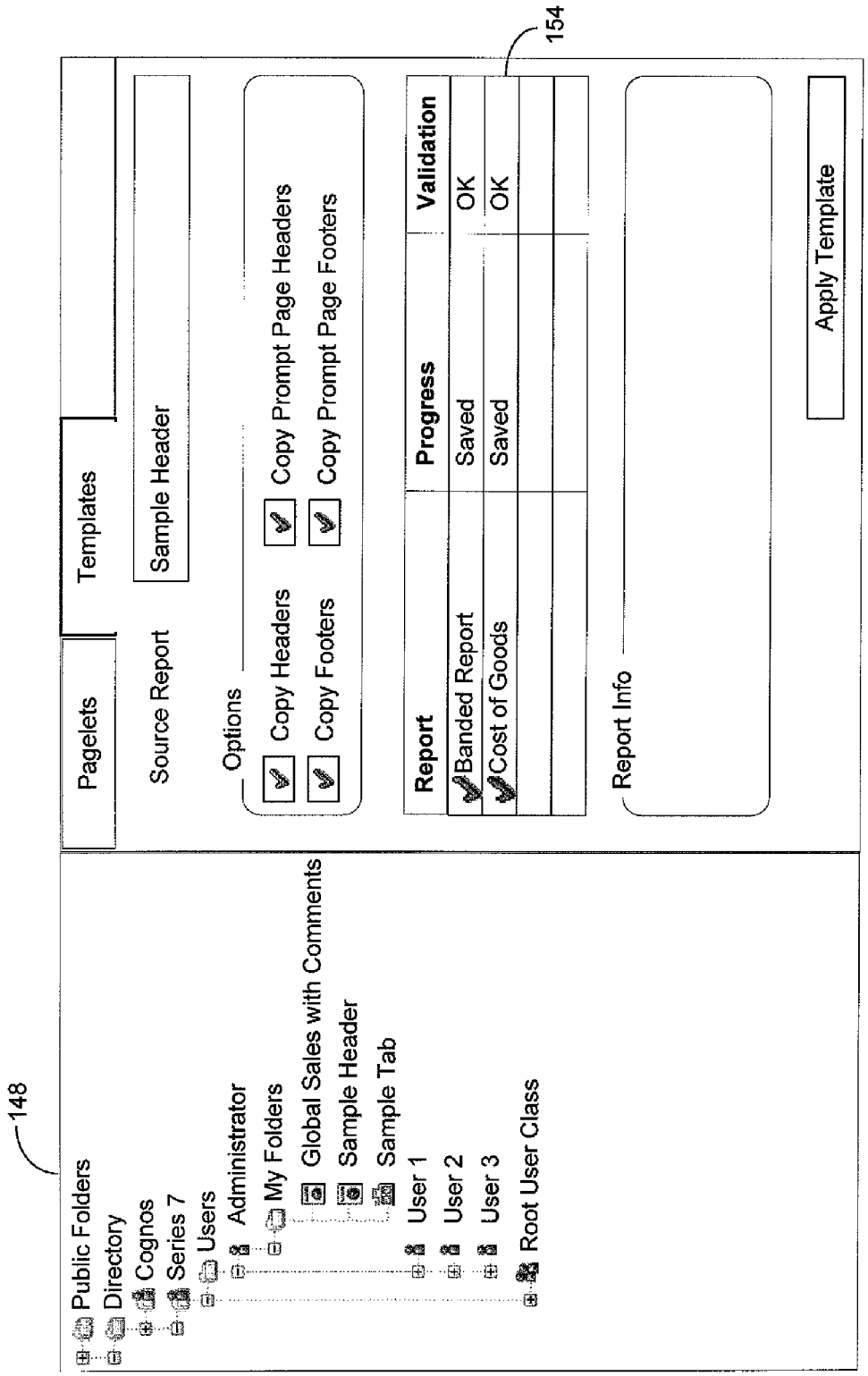

The metadata object dissemination module is configured for similar operation in connection with distributing metadata for template configuration. In this example, templates may be configured using this module by identifying a report specification from the hierarchy pane 148 as a source of one or more metadata objects. To that end, selection of a templates tab of the display interface, as shown in FIG. 18, reveals a source report data input panel into which the source report can be dragged or otherwise moved. Further report specifications may be identified from the hierarchy pane 148 as recipients or targets of the metadata object(s) to be distributed. To that end, the display interface includes a panel or pane 154 into which the target reports can be dragged or otherwise moved.

In this example, the types of metadata objects that can be disseminated include header and footer report objects. Other embodiments may support additional or alternative report items or aspects for distribution, as desired. With the understanding that the embodiment shown in FIG. 19 is exemplary in nature, a panel or pane 156 facilitates the selection of the types of header and footer metadata to be distributed from the source report. Once the selections have been made and confirmed, actuation of the apply template user select button causes the module to standardize the selected target reports with the applicable source report as a template in the manner specified.

Described above are a number of techniques that generally facilitate and automate the processing associated with addressing the complexities arising from the deployment of a business intelligence architecture. Maintaining and managing the metadata, especially in complex or extensive cases, for both the system administrator and the client/end user, can accordingly be made more efficient and less prone to manual error. As described above, the disclosed metadata management techniques can, for example, automate report validation when changes to the underlying packages are made, update metadata to automatically apply Framework Manager model or package changes to impacted reports, and enhance the end user experience by carrying metadata through to end-user reports in the form of screen tips, find and replace expressions within selectable report objects, distribute custom pagelets to selected users, classes or roles, and standardize existing reports by applying a common look and feel. In addition to the foregoing, the modification of metadata via the disclosed metadata management techniques can also propagate changes to security settings on selected objects within the content store.

The foregoing description is provided with the understanding that the use of certain database terminology should not be construed as limiting the practice of the disclosed methods, systems or techniques to a particular database architecture.

The steps of the techniques, methods or instructions described herein are operational with numerous and various general purpose or special purpose computing system environments or configurations. Examples of well known computing systems, environments, and/or configurations that may be suitable for use with the methods or apparatus of the claims involve or include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of techniques, methods or instructions described herein may be set forth in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

Embodiments of the disclosed systems, methods or computer-readable media may be implemented in, or involve, hardware, software, firmware, or any combination thereof. Some embodiments may be implemented as computer programs executing on programmable systems comprising at least one processor (e.g., a microcontroller, an application specific integrated circuit (ASIC), a microprocessor, or a digital signal processor (DSP)), a data storage system (including volatile and non-volatile memory and/or storage elements), at least one input device, and at least one output device. Program code may be applied to input data to perform the functions described herein and generate output information. The output information may be applied to one or more output devices, in known fashion.

The computer-readable instructions described above may be implemented in a high level procedural or object oriented programming language to communicate with a processing system, such as C#. The programs may also be implemented in assembly or machine language, if desired. In fact, practice of the disclosed system and method is not limited to any particular programming language. In any case, the language may be a compiled or interpreted language.

The computers and other hardware described above include a variety of computer-readable media for storing the computer-readable instructions described above. Computer-readable media can be any available media that can be accessed by a computer and includes both volatile and non-volatile media, removable and non-removable media. By way of example, and not limitation, computer-readable media may include or involve a variety of computer storage media types. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computer. Thus, any computer programs, modules or instructions described herein may be stored on or accessed via a wide variety of storage media or devices (e.g., magnetic drive devices, optical drive devices, read only memory (ROM), flash memory devices, or other storage devices) suitable for use with, and readable by, a general or special purpose programmable processing system, for configuring and operating the processing system when the storage media or device is read by the processing system to perform the procedures described herein. Accordingly, embodiments of the disclosed systems, methods, and techniques may also be considered to be implemented as a machine-readable storage medium, configured for use with a processing system, where the storage medium so configured causes the processing system to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A metadata management system for a business intelligence system, the business intelligence system having one or more storage devices for a metadata repository and further having an application server configured to access the metadata repository via a communication protocol and a communication path of the business intelligence system, the metadata management system comprising:
    a user interface generator to display information regarding objects of extensible markup language (XML) metadata content in the metadata repository that define one or more report specifications for presentation of enterprise data via a user web portal of the business intelligence system, each report specification being configured for use by the application server to generate a respective report presenting the enterprise data via the web portal as specified by the XML metadata content objects of the report specification, and to facilitate selection of a group of the XML metadata content objects;
    a content editor to evaluate the XML metadata content stored in the metadata repository for each XML metadata content object of the selected group and to modify in a batch job the XML metadata content for each XML metadata content object of the selected group for storage of the modified XML metadata content in the metadata repository; and
    a communication manager to issue instructions through the application server along the communication path of the business intelligence system for extraction of the XML metadata content for each XML metadata content object of the selected group from the metadata repository and for the storage of the modified XML metadata content in the metadata repository, the instructions being configured in accordance with the communication protocol of the business intelligence system.

2. The metadata management system of claim 1, wherein the content editor is configured to modify the XML metadata content for each object in the selected group to reflect a change to a metadata name referenced in the object.

3. The metadata management system of claim 1, wherein the user interface generator is configured to facilitate the selection of all reports of the user web portal of the business intelligence system such that the content editor is configured to modify the XML metadata content of each report of the user web portal impacted by the change to the metadata name.

4. The metadata management system of claim 1, wherein the user interface generator is configured to identify an XML metadata expression to be found in the XML metadata content for each object of the selected group, and wherein the content editor is configured to replace each found instance of the XML metadata expression with an updated XML metadata expression.

5. The metadata management system of claim 1, wherein the user interface generator is configured to identify respective XML metadata expressions within each object of the selected group, and wherein the content editor is configured to associate the respective XML metadata expressions with each object of the selected group, each respective XML metadata expression being configured to generate a message to be displayed in association with the corresponding object during rendering of the corresponding object within the user web portal of the business intelligence system.

6. The metadata management system of claim 1, wherein the user interface generator is configured to identify respective security metadata for each object of the selected group, and wherein the content editor is configured to associate the respective security metadata with the corresponding object of the selected group.

7. The metadata management system of claim 1, wherein the user interface generator is configured to identify a further object in the metadata repository to be associated with each object of the selected group in the batch job.

8. The metadata management system of claim 7, wherein the selected group corresponds with a user role, a user class, or a user name of the user web portal of the business intelligence system, and wherein the XML metadata object specifies metadata for user displays of the user web portal associated with the user role, the user class, or the user name of the selected group, after implementation of the batch job.

9. The metadata management system of claim 7, wherein the selected group corresponds with a number of the report specifications of the user web portal of the business intelligence system, and wherein at least one of the metadata objects specifies metadata for a report specification element to be incorporated into the number of the report specifications upon implementation of the batch job.

10. The metadata management system of claim 1, wherein the content editor is configured to evaluate syntax of the XML metadata content for each object of the selected group and to update a validation flag of each object when the syntax is valid.

11. The metadata management system of claim 1, wherein the content editor is configured to store a backup copy of the extracted XML metadata content outside of the metadata repository before modification in the batch job.

12. The metadata management system of claim 1, wherein the communication manager is configured to package the instructions in one or more simple object access protocol (SOAP) envelopes.

13. The metadata management system of claim 1, wherein the storage of the modified XML metadata content via the communication path includes conversion of the modified XML metadata content by the application server into binary large objects (BLOBS) to be stored in the metadata repository.

14. A computer-readable medium adapted to store computer-executable instructions for supporting a business intelligence system having a metadata repository and an application server configured to access the metadata repository via a communication protocol and a communication path of the business intelligence system, wherein the computer-executable instructions comprise computer code to:
    display information regarding objects of extensible markup language (XML) metadata content in the metadata repository that define one or more report specifications for presentation of enterprise data via a user web portal of the business intelligence system, each report specification being configured for use by the application server to generate a respective report presenting the enterprise data via the web portal as specified by the XML metadata content objects of the report specification;

facilitate selection of a group of the XML metadata content objects;

issue first instructions for extraction of the XML metadata content for each XML metadata content object of the selected group from the metadata repository;

evaluate the XML metadata content stored in the metadata repository for each XML metadata content object of the selected group;

modify in a batch job the XML metadata content for each XML metadata content object of the selected group for storage of the modified XML metadata content in the metadata repository; and issue second instructions for the storage of the modified XML metadata content, the first and second instructions being issued through the application server along the communication path of the business intelligence system and configured in accordance with the communication protocol of the business intelligence system.

15. The computer-readable medium of claim 14, wherein the computer code to modify the XML metadata content comprises code to modify the XML metadata content of each object in the selected group to reflect a change in a metadata name referenced in the object.

16. The computer-readable medium of claim 14, wherein the computer code to facilitate the selection of the group comprises code to include all report specifications of the user web portal of the business intelligence system in the selected group.

17. The computer-readable medium of claim 14, wherein the computer code to facilitate the selection of the group comprises code to identify an XML metadata expression to be found in the XML metadata content for each object of the selected group, and wherein the computer code to modify the XML metadata content comprises code to replace each found instance of the XML metadata expression with an updated XML metadata expression.

18. The computer-readable medium of claim 14, wherein the computer code to facilitate the selection of the group comprises code to identify respective XML metadata expressions for each object of the selected group, and wherein the computer code to modify the XML metadata content comprises code to associate the respective XML metadata expressions with each object of the selected group, each respective XML metadata expression being configured to generate a message to be displayed in association with the corresponding object during rendering of the corresponding object within the user web portal of the business intelligence system.

19. The computer-readable medium of claim 14, wherein the computer code to facilitate the selection of the group comprises code to identify respective security metadata for each object of the selected group, and wherein the computer code to modify the metadata content comprises code to associate the respective security metadata with the corresponding object of the selected group.

20. The computer-readable medium of claim 14, wherein the computer-executable instructions further comprise code to identify a metadata object in the metadata repository to be distributed to each object of the selected group in the batch job.

21. The computer-readable medium of claim 14, wherein the computer code to evaluate the code comprises code to evaluate syntax of the XML metadata content for each object of the selected group, and wherein the computer code to modify the XML metadata content comprises code to update a validation flag of each object when the syntax is valid.

22. The computer-readable medium of claim 14, wherein the computer-executable instructions comprise further computer code to store a backup copy of the extracted XML metadata content outside of the metadata repository before modification in the batch job.

23. A method of managing a business intelligence system having a metadata repository and an application server configured to access the metadata repository via a communication protocol and a communication path of the business intelligence system for objects of extensible markup language (XML) metadata content in the metadata repository that define one or more report specifications for presentation of enterprise data via a user web portal of the business intelligence system, each report specification being configured for use by the application server to generate a respective report presenting the enterprise data via the web portal as specified by the XML metadata content objects of the report specification, the method comprising the steps of:

generating a user interface to facilitate selection of a group of the XML metadata content objects in the metadata repository to be processed in a batch job;

extracting the XML metadata content for each XML metadata content object of the selected group from the metadata repository;

evaluating the XML metadata content stored in the metadata repository for each XML metadata content object of the selected group during implementation of the batch job for the selected group; and providing results of the evaluating step to indicate an extent to which the XML metadata content has been validated;

wherein the extracting step includes issuing instructions through the application server along the communication path of the business intelligence system, the instructions being configured in accordance with the communication protocol of the business intelligence system.

24. The method of claim 23, further comprising the step of issuing further instructions through the application server along the communication path and in accordance with the communication protocol to store the XML metadata content in the metadata repository in a manner indicative of whether the XML metadata content for the object has been validated via the evaluating step.

25. The method of claim 24, wherein the step of issuing further instructions comprises the step of setting a respective flag for the objects for which the XML metadata content of the object has been validated.

26. The method of claim 23, wherein the evaluating step comprises the step of comparing the XML metadata content with a model that defines data sources for the business intelligence system.

27. The method of claim 23, wherein the evaluating step comprises determining whether the extracted XML metadata content has correct syntax.

28. The method of claim 23, wherein the user interface comprises a hierarchy view of objects in the metadata repository.

29. The method of claim 23, wherein the providing step comprises the step of presenting the results via the user interface to facilitate selection of an invalid object for displaying a message regarding the XML metadata content of the object.

30. The method of claim 23, wherein the step of evaluating the XML metadata content comprises comparing the XML metadata content for each XML metadata content object of the selected group with a metadata definition package of the business intelligence system to validate each XML metadata content object of the selected group.

31. The metadata management system of claim 1, wherein the content editor is configured to compare the XML metadata content or the modified XML metadata content for each XML metadata content object of the selected group with a metadata definition package of the business intelligence system to validate each XML metadata content object of the selected group before the storage of the modified XML metadata content.

32. The metadata management system of claim 31, wherein the user interface generator is configured to provide an indication of an extent to which the XML metadata content for each XML metadata content object of the selected group has been validated.

33. The metadata management system of claim 31, wherein the user interface generator is further configured to facilitate selection of an invalid object of the selected group and to generate a failure message regarding the invalid object.

34. The metadata management system of claim 31, wherein the content editor is configured to validate the XML metadata content for each XML metadata content object of the selected group as a prerequisite to modification of the XML metadata content for each XML metadata content object of the selected group.

35. The computer-readable medium of claim 14, wherein the computer code is configured to compare the XML metadata content or the modified XML metadata content for each XML metadata content object of the selected group with a metadata definition package of the business intelligence system to validate each XML metadata content object of the selected group before the storage of the modified XML metadata content.

36. The computer-readable medium of claim 35, wherein the computer code to display information comprises code to provide an indication of an extent to which the XML metadata content for each XML metadata content object of the selected group has been validated.

37. The computer-readable medium of claim 35, wherein the computer code to display information further comprises code to facilitate selection of an invalid object of the selected group and to generate a failure message regarding the invalid object.

38. The computer-readable medium of claim 35, wherein the computer code is configured to validate the XML metadata content for each XML metadata content object of the selected group as a prerequisite to modification of the XML metadata content for each XML metadata content object of the selected group.

* * * * *